United States Patent
Kawano

(10) Patent No.: US 9,406,002 B2
(45) Date of Patent: Aug. 2, 2016

(54) PROCESSING DEVICE THAT CORRECTS PIXELS OF AN EDGE-PORTION CORRECTION AREA OF A PRINT IMAGE

(71) Applicant: Oki Data Corporation, Tokyo (JP)

(72) Inventor: Akimitsu Kawano, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/716,931

(22) Filed: May 20, 2015

(65) Prior Publication Data

US 2015/0339554 A1  Nov. 26, 2015

(30) Foreign Application Priority Data

May 22, 2014  (JP) ................................. 2014-106380

(51) Int. Cl.
*H04N 1/407* (2006.01)
*G06K 15/02* (2006.01)

(52) U.S. Cl.
CPC .................................. *G06K 15/1872* (2013.01)

(58) Field of Classification Search
None
See application file for complete search history.

(56) References Cited

U.S. PATENT DOCUMENTS

| | | | | |
|---|---|---|---|---|
| 5,252,995 A * | 10/1993 | Trask | ...................... | H04N 1/58 347/119 |
| 5,418,574 A * | 5/1995 | Miyabata | ............... | H04N 9/646 348/253 |
| 7,059,785 B2 * | 6/2006 | Kato | .......................... | B41J 3/44 400/61 |
| 7,123,339 B2 * | 10/2006 | Valenzuela | .......... | G11B 7/0032 352/26 |
| 7,315,641 B1 * | 1/2008 | Yoshikawa | .............. | G03F 1/144 382/144 |
| 7,697,163 B2 * | 4/2010 | Yokochi | .................. | H04N 1/58 358/1.9 |
| 2010/0165398 A1 | 7/2010 | Watanabe | | |
| 2012/0268758 A1 | 10/2012 | Watanabe | | |
| 2014/0185067 A1 | 7/2014 | Kawano | | |

FOREIGN PATENT DOCUMENTS

| | | |
|---|---|---|
| CN | 103905690 A | 7/2014 |
| EP | 2750367 A2 | 7/2014 |
| JP | 2010-152209 A | 7/2010 |
| JP | 2014-127918 A | 7/2014 |

* cited by examiner

*Primary Examiner* — Steven Kau
(74) *Attorney, Agent, or Firm* — Mots Law, PLLC

(57) ABSTRACT

An image processing device includes a correction processor that corrects print image data by correcting an edge-portion correction area in an edge portion of a print image based on the print image data. The edge-portion correct area extends along image edge having a ground color and an upper layer color over the ground color in the edge portion.

14 Claims, 15 Drawing Sheets

SECOND EDGE-PORTION CORRECTION AREA DETECTION PROCESSING PROCEDURE

CIRCUIT CONFIGURATION OF COLOR PRINTER ACCORDING TO EMBODIMENT 1

STATE OF DETECTION OF BOUNDARY CORRECTION AREA IN PRINT IMAGE

STATE OF FIRST AREA DETECTION RANGE WITH RESPECT TO PRINT IMAGE

STATE OF DETECTION OF EDGE - PORTION CORRECTION
AREA FOR BORDERED MODE IN PRINT IMAGE

STATE OF FIRST CORRECTION PROCESSING APPLIED ON PRINT IMAGE

STATE OF FORMATION OF PRINT IMAGE ON SURFACE OF
PRINT MEDIUM BASED ON CORRECTED PRINT IMAGE DATA

STATE OF MISREGISTRATION OF GROUND COLOR AND UPPER COLOR IN CASE OF FORMING PRINT IMAGE IN CONVENTIONAL COLOR PRINTER

STATE OF MISREGISTRATION OF GROUND COLOR AND UPPER COLOR IN CASE OF FORMING PRINT IMAGE IN COLOR PRINTER ACCORDING TO EMBODIMENT 1

BOUNDARY CORRECTION AREA DETECTION PROCESSING PROCEDURE

FIRST EDGE-PORTION CORRECTION AREA
DETECTION PROCESSING PROCEDURE

FIRST CORRECTION PROCESSING PROCEDURE

CIRCUIT CONFIGURATION OF COLOR PRINTER ACCORDING TO SECOND EMBODIMENT

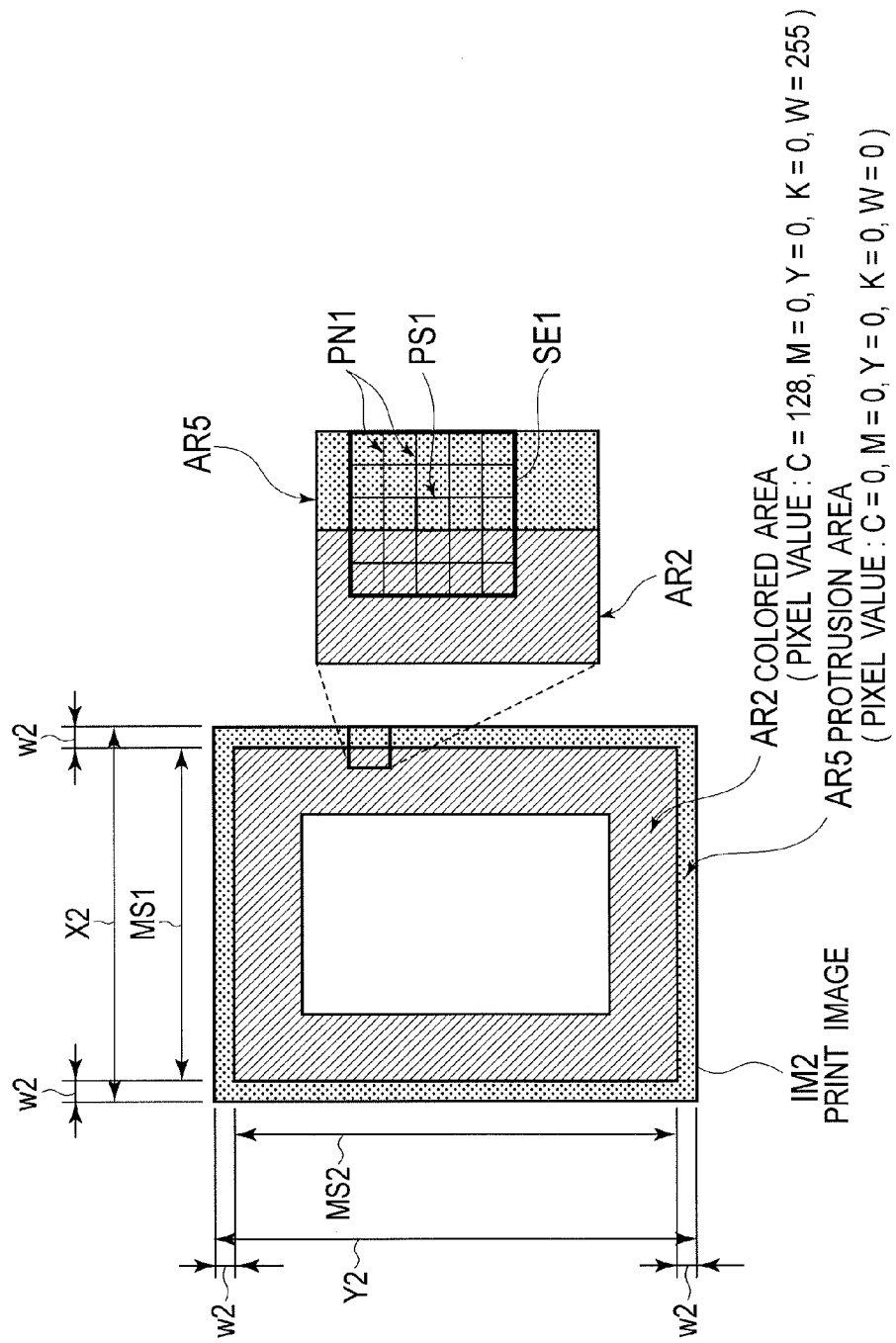

STATE OF MISREGISTRATION OF GROUND COLOR AND UPPER COLOR IN CASE OF FORMING PRINT IMAGE IN CONVENTIONAL COLOR PRINTER

STATE OF MISREGISTRATION OF GROUND COLOR AND UPPER COLOR IN CASE OF FORMING PRINT IMAGE IN COLOR PRINTER ACCORDING TO SECOND EMBODIMENT

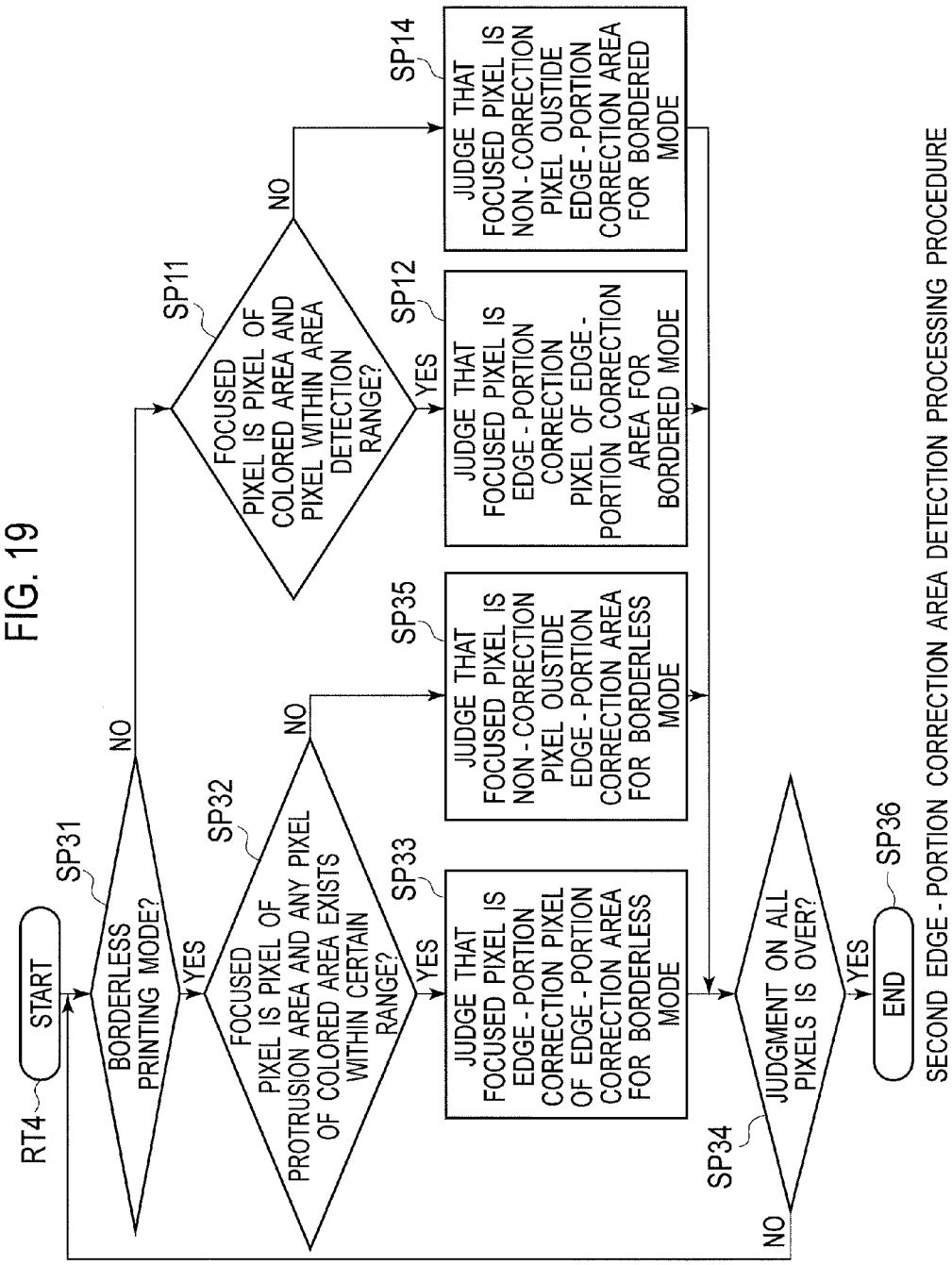

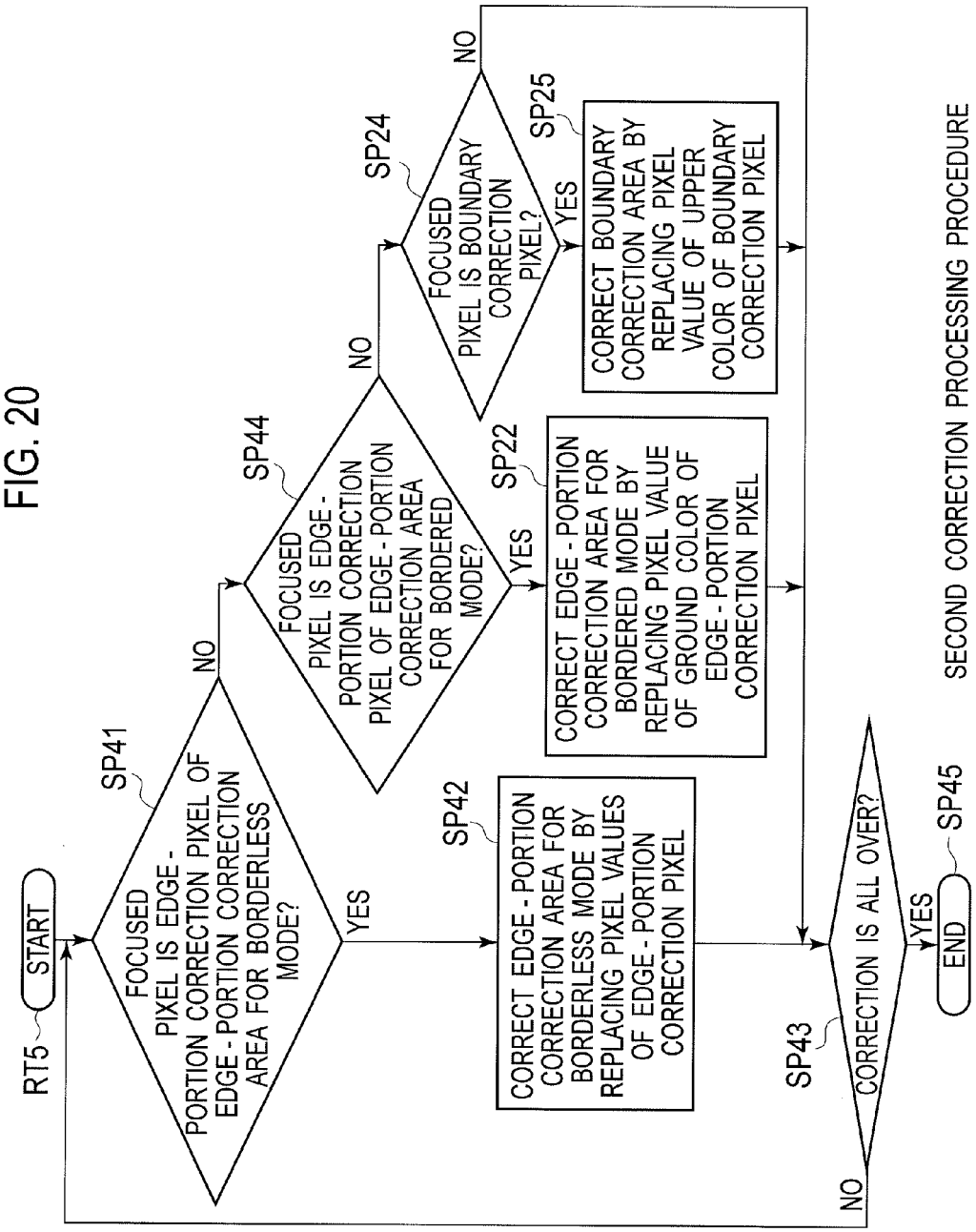

PROCESSING DEVICE THAT CORRECTS PIXELS OF AN EDGE-PORTION CORRECTION AREA OF A PRINT IMAGE

CROSS REFERENCE TO RELATED APPLICATIONS

This application claims priority based on 35 USC 119 from prior Japanese Patent Application No. 2014-106380 filed on May 22, 2014 entitled "PROCESSING DEVICE", the entire contents of which are incorporated herein by reference.

BACKGROUND OF THE INVENTION

1. Field of the Invention

This disclosure relates to an image processing device, and is suitable for application to color electrophotographic printers (hereinafter also referred to as color printers), for example.

2. Description of Related Art

A conventional color printer is provided with five image drum units arranged in a row. Four of these image drum units form toner images with toners of four different colors, i.e., cyan, magenta, yellow, and black, which are base colors for the formation of a print image, and the remaining one image drum unit forms a toner image of the same pattern as that of a base color portion of a print image with toner of one color, such as clear or white, which is a special color for the formation of a print image. Then, the color printer forms a print image in which the special color is laid over the base colors in such a way that the toner images of the base colors formed by the four image drum units and the toner image of the special color formed by the one image drum unit are transferred sequentially one over another in that order and fixed to a surface of a medium to be printed (print medium). Alternatively, the color printer forms a print image in which the base colors are laid over the special color in such a way that the toner images of the base colors formed by the four image drum units are transferred sequentially one over another and fixed to a surface of a print medium, and then the toner image of the special color formed by the one image drum unit is transferred and fixed thereto (see Patent Literature 1, for example).

[Patent Literature 1] Japanese Patent Application Publication No. 2010-152209 (pp. 7, 8, and 14, and FIG. 1)

SUMMARY OF THE INVENTION

A conventional color printer forms a print image in which the special color is laid over the base colors or a print image in which the base colors are laid over the special color by laying toner images of five colors, one over another, on a surface of a print medium. However, in some color printers, the toner images are transferred onto the surface of the print medium while being misaligned relative to their ideal transfer positions depending on factors such as the assembly precision of the printer. In this case, the color printer has a problem that the special color spreads out from under the base colors and stands out, or the base colors spread out from under the special color and stand out in an edge portion of the print image formed on the surface of the printed medium, which deteriorates the quality of the print image.

An objective of an embodiment of the invention is to provide an image processing device capable of reducing deterioration in the quality of a print image.

An aspect of the invention is an image processing device that includes a correction processor configured to correct print image data by correcting an edge-portion correction area in an edge portion of a print image based on the print image data, the area extending along image edge expressed with a ground color and an upper color laid over the ground color in the edge portion. According to the above aspect of the invention, in the image edge portion of the print image based on the print image data, it is possible to make the width of the ground color narrower than the width of the upper color such that the area of the ground color retreats toward the center of the image from the image edges, or to lower the density of the ground color. By doing so, even if the ground color and the upper color are misaligned with each other in the edge portion of the print image when the image is formed on the surface of the print medium, it is possible to prevent the ground color from spreading out from under the upper color or make the ground color spreading out from under the upper color less likely to stand out. Thereby, the deterioration in the quality of the print image can be reduced.

BRIEF DESCRIPTION OF THE DRAWINGS

FIG. 16 is a schematic diagram for explaining the detection of an edge-portion correction area for a borderless mode of a print image.

FIG. 19 is a flowchart illustrating a second edge-portion correction area detection processing procedure.

FIG. 20 is a flowchart illustrating a second correction processing procedure.

DETAILED DESCRIPTION OF EMBODIMENTS

Figure 1:
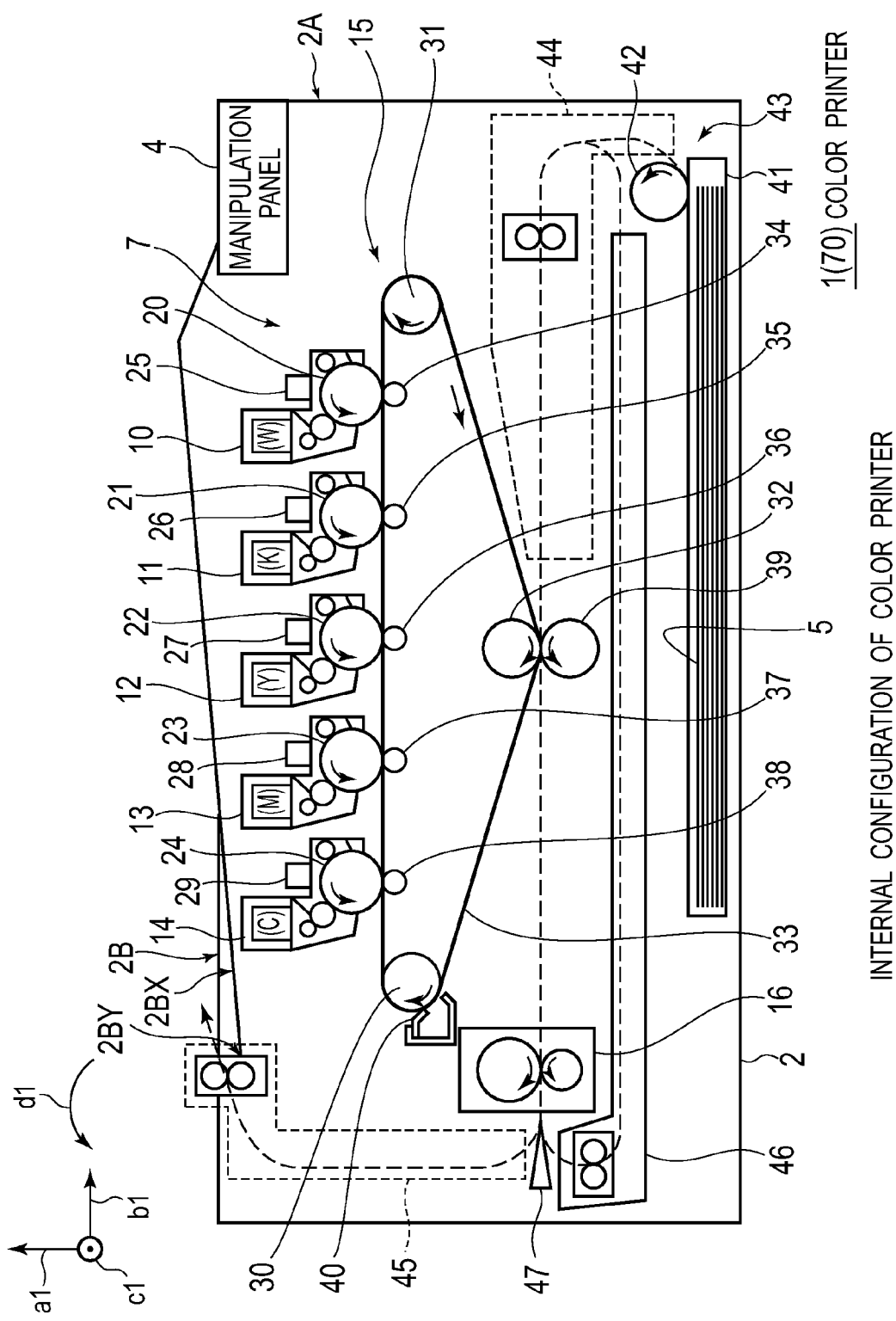
FIG. 1 is a schematic side view illustrating the internal configuration of a color printer according to the invention.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Note that the description is provided in the following order: (1) Embodiment 1, (2) Embodiment 2, and (3) Other Embodiments.

(1) Embodiment 1

(1-1) Internal Configuration of a Color Printer

In FIG. 1, throughout the description, reference numeral 1 denotes color printer 1 of a secondary transfer type according to the invention. Color printer 1 includes, for example, printer chassis 2 of substantially a box shape whose front surface 2A is a right edge surface in the drawing. Incidentally, in the following description, an upward direction denoted by arrow al in the drawing when color printer 1 is viewed while facing front surface 2A is also referred to as a printer upward direction and a direction opposite the upward direction is also referred to as a printer downward direction. These directions are also referred to as a printer upward/downward direction collectively when these need not be particularly distinguished from each other or both of these are meant. In addition, in the following description, a forward direction denoted by arrow b1 in the drawing when color printer 1 is viewed while facing front surface 2A is also referred to as a printer forward direction and a direction opposite the forward direction is also referred to as a printer backward direction. These directions are also referred to as a printer forward/backward direction collectively when these need not be particularly distinguished from each other or both of these are meant. Further, in the following description, a leftward direction denoted by arrow c1 in the drawing when color printer 1 is viewed while facing front surface 2A is also referred to as a printer leftward direction and a direction opposite the leftward direction is also referred to as a rightward direction. These directions are also referred to as a printer leftward/rightward direction collectively when these need not be particularly distinguished from each other or both of these are meant. Furthermore, in the following description, a rotation direction denoted by arrow dl in the drawing, which is about an axis parallel with the printer leftward/rightward direction, is also referred to as one rotation direction and a direction opposite this direction is also referred to as the other rotation direction.

Manipulation panel 4 having various manipulation keys, a touch screen, and the like is disposed in, for example, a front edge portion of upper surface 2B of printer chassis 2. Moreover, in upper surface 2B, printer chassis 2 is provided with medium delivery section 2BX that places thereon a rectangular medium to be printed (print medium 5), for example, having a print image formed thereon and delivers it to the user. Medium ejection port 2BY is formed in a rear inner wall of this medium delivery section 2BX. On the other hand, image formation section 7 for forming a print image on a surface of print medium 5 is disposed in a central portion of printer chassis 2. Image formation section 7 includes five, namely, a first to fifth, image formation units 10 to 14, transfer unit 15, and fixation unit 16, for example.

First to fifth image formation units 10 to 14 are detachably attached to be arranged in a row in the printer rearward direction. In this respect, four rear image formation units, namely, second to fifth image formation units 11 to 14, each hold toner as a developer of any of the four colors, i.e., black (K), yellow (Y), magenta (M), and cyan (C), for example, which are base colors for the formation of a print image, such that image formation units 11 to 14 hold the colors different from each other. Meanwhile, one foremost image formation unit, namely, first image formation unit 10 holds toner of white (W), for example, which is a special color for the formation of a print image. First to fifth image formation units 10 to 14 are configured to respectively form electrostatic latent images on the surfaces of first to fifth photoconductive drums 20 to 24, which are image carriers that rotate in the one rotation direction, by irradiating respectively the surfaces of the photoconductive drums with exposure light using first to fifth LED (light emitting diode) heads 25 to 29, which are exposure units that are controlled based on corresponding color components of a print image, and then form toner images, which are developer images, by developing the electrostatic latent images with toner. Note that, first image formation unit 10 may be replaced with a unit holding a toner of clear (CL) which is a special color, for example, since this unit is attachable to and detachable from printer chassis 2.

In transfer unit 15, endless transfer belt 33 is stretched around belt drive roller 30, driven roller 31, and backup roller 32 that rotate in the other rotation direction. Transfer unit 15 is configured to transfer, sequentially one over another, the toner images of first to fifth photoconductive drums 20 to 24 onto the surface of transfer belt 33 between belt drive roller 30 and driven roller 31 with five primary transfer rollers 34 to 38, and transfer the toner images on transfer belt 33 onto the surface of print medium 5 with secondary transfer roller 39 facing backup roller 32. Note that transfer unit 15 has cleaning blade 40 provided in its rear end portion such that one end portion of cleaning blade 40 is pressed against the surface of transfer belt 33. Thereby, transfer unit 15 can remove toner, which remains un-transferred on the surface of print medium 5, from the surface of transfer belt 33 by use of cleaning blade 40. The fixation unit is configured to apply heat and pressure on the toner image transferred on the surface of print medium 5 by transfer unit 15, and thus melt and fix the toner image to the surface of print medium 5 to form a print image thereon.

In addition, medium supply section 43 is disposed inside printer chassis 2 in its lower end portion. Medium supply section 43 is configured to feed one print medium 5 at a time with feed roller 42 from media cassette 41 that is loaded with print media 5. Note that color printer 1 can use various print media 5, such as white plain paper and plain paper of colors other than white of a predefined medium size, and transfer paper for printing on a T-shirt, for formation of a print image by loading these various print media 5 in media cassette 41. Moreover, a transport section for medium supply 44 is provided inside printer chassis 2 in its front lower end portion. Transport section for medium supply 44 is configured to transport print medium 5 fed from media cassette 41 to image formation section 7 through a transport path for the medium supply. Further, a transport section for medium ejection 45 is provided inside printer chassis 2 in its rear end portion. The transport section for medium ejection 45 is configured to transport print medium 5 fed from fixation unit 16 to medium ejection port 2BY through a transport path for the medium ejection. Furthermore, a transport section for medium resupply 46 is provided inside printer chassis 2 between image formation section 7 and medium supply section 43. The transport section for medium resupply 46 is configured to transport print medium 5 fed from fixation unit 16 back to the transport section for medium supply 44 through a transport path for the medium resupply. Besides, separator 47 is disposed inside printer chassis 2. Separator 47 is configured to change the path to transport print medium 5 fed from fixation unit 16 between the transport path for medium ejection and the transport path for medium resupply.

In the situation where first image formation unit 10 holding white toner is attached to color printer 1 and plain paper of white or another color is loaded in media cassette 41 as print medium 5, for example, the printer forms toner images of black, yellow, magenta, and cyan on the surfaces of second to fifth photoconductive drums 21 to 24 with second to fifth image formation units 11 to 14 and forms a white toner image, having substantially the same pattern as that of a black, yellow, magenta, and cyan portion of a print image, on the surface of first photoconductive drum 20 with first image formation unit 10, then transfers the toner images onto the surface of transfer belt 33 one over another in the order of cyan, magenta, yellow, black, and white, and then transfers the toner images of five colors, thus formed on transfer belt 33, onto a surface of a plain paper sheet that is transported from medium supply section 43 through the transport path for medium supply. Further, after color printer 1 forms a print image represented with the base colors and the special color by fixing the toner images of five colors to the surface of the plain paper sheet with fixation unit 16, it transports the plain paper sheet to medium ejection port 2BY through the transport path for medium ejection and ejects it to medium delivery section 2BX. Here, color printer 1 transfers the toner images of five colors, thus transferred on the surface of transfer belt 33, upside down onto the surface of the plain paper sheet. As a result, the white toner image is interposed between the surface of the plain paper sheet and the toner images of the base colors, and white serves as a foundation for the base colors in the print image. Thereby, thanks to white serving as the foundation for the base colors, color printer 1 can represent the print image with the base colors as clear as their original colors no matter which of a white plain paper sheet and a plain paper sheet of another color is used as print medium 5 on which the print image is formed.

On the other hand, in the situation where first image formation unit 10 holding white toner is attached to color printer 1 and transfer paper is loaded in media cassette 41 as print medium 5, the printer forms toner images on the surfaces of second to fifth photoconductive drums 21 to 24 with second to fifth image formation units 11 to 14. and transfers the toner images onto the surface of transfer belt 33 one over another in the order of cyan, magenta, yellow, and black, and then transfers the toner images of four colors, thus formed on transfer belt 33, onto a surface of a transfer paper sheet that is transported from medium supply section 43 through the transport path for medium supply. Note that, in this event, color printer 1 changes a medium transport path with separator 47 to supply the transfer paper sheet, which is fed from fixation unit 16 with a print image represented only with the base colors formed thereon, to image formation section 7 again by way of the transport path for medium resupply and the transport path for medium supply, in this order. While the sheet is being resupplied, color printer 1 forms a white toner image, having substantially the same pattern as that of a black, yellow, magenta, and cyan portion of a print image, on the surface of first photoconductive drum 20 with first image formation unit 10 and transfers the toner image onto the surface of transfer belt 33. Then, the printer transfers the toner image, thus formed on transfer belt 33, onto the surface of the resupplied transfer paper sheet such that the toner image is laid over the print image on the surface of the sheet. After color printer 1 forms a print image represented with the special color as well as the base color by fixing the white toner image to the print image on the surface of the transfer paper sheet with fixation unit 16, the printer changes the medium transport path again with separator 47 and thereby transports the transfer paper sheet to medium ejection port 2BY through the transport path for medium ejection and ejects it to medium delivery section 2BX. In this case, color printer 1 forms the print image by transferring and fixing the toner image of the base colors on the surface of the transfer paper sheet, and then transferring and fixing the toner image of white as the special color. Thus, the base colors can be coated with white in the print image. Because the transfer with the transfer paper sheet is made by bringing the print image on that surface into contact with the surface of a T-shirt, color printer 1 can make white serve as a foundation for the base colors when the print image is transferred onto a T-shirt by way of the transfer paper sheet. Thereby, thanks to white serving as the foundation for the base colors, color printer 1 can represent the print image with the base colors as clear as their original colors no matter which of a white T-shirt and a T-shirt of another color is used as the medium on which the print image is transferred.

On the other hand, in the situation where first image formation unit 10 holding clear toner is attached to color printer 1 and plain paper of white or another color is loaded in media cassette 41 as print medium 5, for example, the printer forms a print image by transferring and fixing toner images of the base colors to the surface of a plain paper sheet and then transferring and fixing thereto a toner image of clear as the special color, as in the case of forming a print image on the surface of a transfer paper sheet. Thereby, color printer 1 can gloss the base colors by coating the base colors with the color of clear in the print image formed on the surface of the plain paper sheet. In this way, color printer 1 can form a print image in the bordered printing mode on the surface of any of various print media 5, for example, such that the base colors and the special color are laid in the order predefined according to the type of print medium 5.

Meanwhile, as described above, when color printer 1 forms a print image represented with the base colors and white as the special color on the surface of a plain paper sheet as print medium 5, the special color serves as the foundation for the base colors. Further, when color printer 1 forms a print image represented with the base colors and white as the special color on the surface of a transfer paper sheet as print medium 5, the special color is located on the base colors on the transfer paper sheet, but as in the above case, the special color serves as the foundation for the base colors in the state where the print image is transferred on the surface of a T-shirt. Furthermore, when color printer 1 forms a print image represented with the base colors and the color of clear as the special color on the surface of a plain paper sheet as print medium 5, the special color is located on the base colors, and the base colors serve as the foundation for the special color. Hence, in the following description, depending on the type of print medium 5 on which a print image is to be formed and the type of the special color used to represent the print image, white as the special color which serves as the foundation for the base colors in the print image and the base colors which serve as the foundation for the color of clear as the special color in the print image are also called a ground color as appropriate, and the base colors which are located on white as the special color serving as the foundation for the base colors in the print image and the color of clear as the special color which is located on the base colors serving as the foundation for the special color are also called an upper color as appropriate.

(1-2) Circuit Configuration of the Color Printer

Figure 2:
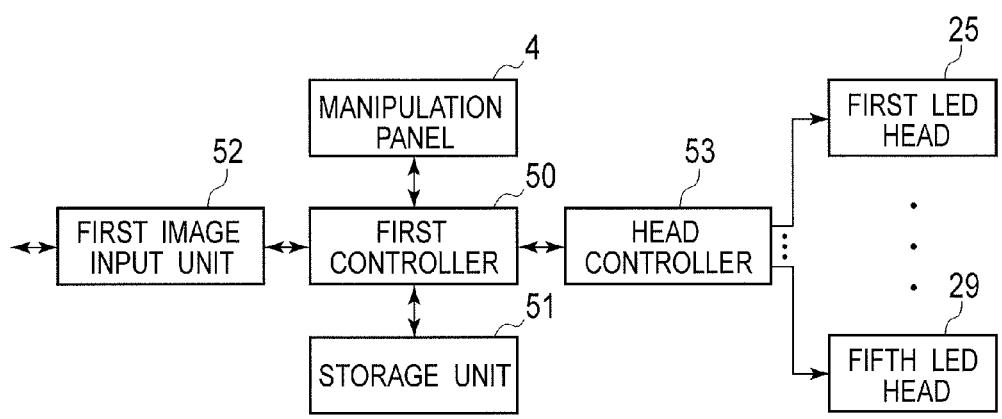
FIG. 2 is a block diagram illustrating the circuit configuration of the color printer according to embodiment 1.

Next, the circuit configuration of color printer 1 is described using FIG. 2. In color printer 1, storage unit 51 such as a hard disc drive or a ROM (Read Only Memory), a memory (not illustrated) such as a RAM (Random Access Memory) serving as a work area for first controller 50, and manipulation panel 4 described above are connected to first controller 50, such as a CPU (Central Processing Unit) or a microprocessor. Moreover, first image input unit 52 and head controller 53 are connected to first controller 50. First image input unit 52 is configured to load image data of an image to be printed from the outside and generate print image data of the print image having an image size slightly smaller than the size of the print medium for use in bordered printing, for example. Head controller 53 is configured to control first to fifth LED heads 25 to 29 described above. Note that, first image input unit 52 is capable of loading image data of an image to be printed that is stored in, for example, an external memory such as a USB (Universal Serial Bus) memory or a memory card attached to color printer 1. Alternatively, first image input unit 52 is also capable of loading image data of an image to be printed from, for example, an imaging device connected to color printer 1 by wire or wireless, such as a digital still camera or a mobile information terminal equipped with a camera function. Still alternatively, first image input unit 52 is also capable of loading image data of an image to be printed from, for example, an information processing device connected to color printer 1 by wire or wireless, such as a personal computer.

First controller 50 is configured to load various programs such as a base program, a first image processing program, and a variety of application programs previously stored in storage unit 51 from the storage unit to the memory as appropriate, and expand these in the memory. Further, first controller 50 is configured to exert an overall control on color printer 1 according to the various programs thus developed in the memory, and execute predetermined arithmetic processing, various processing in response to manipulation commands inputted through manipulation panel 4, and the like. With these functions, at the time of forming a print image, first controller 50 drives image formation section 7, medium supply section 43, and the like for forming a print image, executes image processing on print image data given by first image input unit 52, and sends corrected print image data thus obtained to head controller 53. In this event, based on the corrected print image data given by first controller 50, head controller 53 generates second to fifth head control data corresponding to color components of cyan, magenta, yellow, and black of the print image, and generates first head control data corresponding to a color component of white or clear of the print image. In addition, under control of first controller 50, head controller 53 sends each of first to fifth head control data to a corresponding one of first to fifth LED heads 25 to 29 at a predetermined timing. In this way, in first to fifth image formation units 10 to 14, first controller 50 can drive first to fifth LED heads 25 to 29 to form electrostatic latent images on the surfaces of first to fifth photoconductive drums 20 to 24 based on first to fifth head control data, and form toner images by developing the electrostatic latent images with toner. Further, first controller 50 can form a print image on the surface of print medium 5 as described above based on the toner images formed by first to fifth image formation units 10 to 14.

Meanwhile, in some color printers, toner images on the surfaces of first to fifth photoconductive drums 20 to 24 are transferred onto the surface of transfer belt 33 while being misaligned relative to their ideal transfer positions depending on factors such as assembly precision of the printer. In this case, because the toner images of five colors on transfer belt 33 are transferred and fixed to the surface of print medium 5 while being misaligned with each other in color printer 1, such misregistration leads to a misregistration of the ground color and the upper color laid one over another in a print image. This eventually makes the ground color spread out from under the upper color in an edge portion and a central portion of the print image. Further, in color printer 1, depending on factors such as its assembly precision, there is tendency that the misregistration of the ground color and the upper color laid one over another in the print image increases and a larger portion of the ground color spreads out from under the upper color in the case of forming a print image. This happens in such a way that a toner image of a special color on transfer belt 33 is transferred and fixed to the surface of print medium 5. Then toner images of base colors on the belt are transferred and fixed thereto; or in the case of forming a print image in such a way that toner images of the base colors on the belt are transferred and fixed to the surface of print medium 5 and then a toner image of the special color on the belt is transferred and fixed thereto. This is as compared to the case of forming a print image in such a way that toner images of the base colors and a toner image of the special color on the belt are transferred and fixed to the surface of print medium 5 at the same time. Incidentally, in the following description, an image formation method of forming a print image in such a way that toner images of the base colors and a toner image of the special color on transfer belt 33 are transferred and fixed to the surface of print medium 5 at the same time is also referred to as a first image formation method. An image formation method of forming a print image in such a way that toner images of the base colors on transfer belt 33 are transferred and fixed to a surface of print medium 5 and then a toner image of the special color on transfer belt 33 is transferred and fixed thereto is also referred to as a second image formation method.

To deal with such a phenomenon, color printer 1 previously detects, for example, the amount of first misregistration estimated to occur between the ground color and the upper color, laid one over another, when a print image is formed in the bordered printing mode on the surface of print medium 5 with the first image formation method and the ground color spreads out from under the upper color in this print image. In addition, based on the amount of the first misregistration, color printer 1 assigns, as appropriate, a block-shaped first pixel search range for searching pixels to be corrected in the print image, for example. Further, based on the amount of the first misregistration and the image size of the print image, the color printer assigns, as appropriate, a first area detection range for detecting an edge-portion area to be corrected in an edge portion of the print image for bordered printing (hereinafter, such an area is also referred to as an edge-portion correction area for bordered mode). The first area detection range is in the shape of a frame going around the print image along the edges of the image. Thus, first controller 50 stores, in storage unit 51, first pixel search range information indicating the first pixel search range and first area detection range information indicating the first area detection range. Besides, color printer 1 also previously detects, for example, the amount of second misregistration estimated to occur between the ground color and the upper color, laid one over another, when a print image is formed in the bordered printing mode on a surface of print medium 5 with the second image formation method and the ground color spreads out from under the upper color in this print image. In addition, based on the amount of the second misregistration, color printer 1 assigns, as appropriate, a block-shaped second pixel search range for searching pixels to be corrected in the print image for bordered printing, for example. Further, based on the amount of the second misregistration and the image size, a second area detection range in the shape of a frame, going around the print image along the edges of the image, is determined for detecting an edge-portion correction area for the bordered mode in an edge portion of the print image. Thus, first controller 50 stores, in storage unit 51, second pixel search range information indicating the second pixel search range and second area detection range information indicating the second area detection range.

Incidentally, the amount of the first misregistration is detected as the first misregistration distance represented with pixels and the first misregistration direction, for example. When the amount of the first misregistration is used for assignment of the first pixel search range, a reference length for the search range assignment is obtained by doubling the first misregistration distance in the first misregistration direction, and the reference length for search range assignment is divided into a main-direction component length in a main-scanning direction of the print image and a sub-direction component length in a sub-scanning direction. In this way, the first pixel search range is assigned in the shape of a square or a rectangular block whose lengths in the main-scanning direction and in the sub-scanning direction are equal to the main-direction component length and the sub-direction component length of the reference length for search range assignment, respectively. Meanwhile, when the amount of the first misregistration is used for the assignment of the first area detection range, the first misregistration distance in the first misregistration direction is directly used as a reference length for detection of the range assignment and is divided into a main-direction component length in the main-scanning direction of the print image and a sub-direction component length in the sub-scanning direction. In this way, the first area detection range is assigned in the shape of a frame whose width between strip-shaped portions on one and the other image-edge sides in the main-scanning direction of the print image (hereinafter, such edges are also referred to as image left/right edges collectively and such portions are also referred to as left/right strip-shaped portions collectively) is equal to the main-direction component length of the reference length for detection of the range assignment and whose width between strip-shaped portions on one and the other image-edge sides in the sub-scanning direction (hereinafter, such edges are also referred to as image top/bottom edges collectively and such portions are also referred to as top/bottom strip-shaped portions collectively) is equal to the sub-direction component length of the reference length for detection range assignment. In other words, the first area detection range is assigned in the shape of a frame whose widths between the left/right strip-shaped portions and between the top/bottom strip-shaped portions are equal to or different from each other. Besides, the second pixel search range and the second area detection range are assigned in the same manner as the first pixel search range and the first area detection range based on the amount of the second misregistration detected as a second misregistration distance represented with pixels and a second misregistration direction. Note, however, that a portion of the ground color spreading out from under the upper color tends to be larger in the second image formation method than in the first image formation method as described above. Thus, in response to that tendency, the second pixel search range and the second area detection range are assigned so that they may be wider in at least one of the main-scanning direction and the sub-scanning direction than the first pixel search range and the first area detection range.

Figure 3:
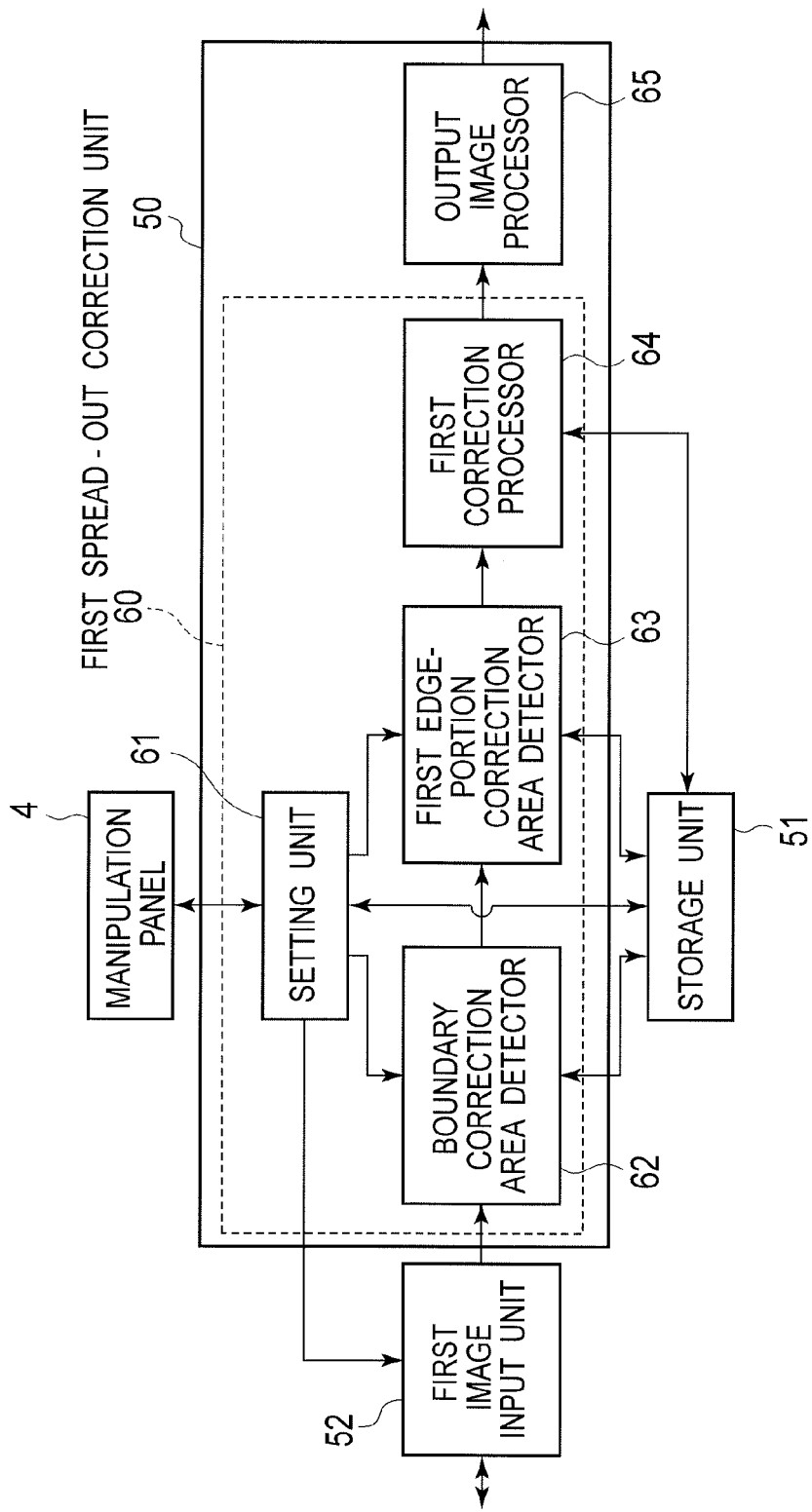
FIG. 3 is a block diagram of functional circuit blocks for explaining first image processing executed by a first controller.

With the configuration above, upon receiving print image data from first image input unit 52 in the formation of a print image, first controller 50 executes a first image processing by using the first pixel search range, the first area detection range, the second pixel search range, and the second area detection range to prevent the ground color from spreading out from under the upper color throughout the print image (i.e., in an edge portion and a central portion of the image). In fact, first controller 50 executes the first image processing according to the first image processing program stored in storage unit 51 by using the print image data generated by first image input unit 52. With reference to FIG. 3, print image data generation processing executed by first image input unit 52 is described specifically below, and besides, while various functions that first controller 50 implements according to the first image processing program are indicated by functional circuit blocks for the sake of convenience, the first image processing that first controller 50 executes according to the first image processing program is described specifically below as the processing executed by the functional circuit blocks.

In this case, when a command to display a setting screen is made at any timing by the user through manipulation panel 4, for example, setting unit 61 of first spread-out correction unit 60 retrieves setting screen data from storage unit 51, and sends it to manipulation panel 4 to display the setting screen in response to the command. Setting unit 61 thereby makes the user input the type of print medium 5 loaded in media cassette 41 and a color of toner held by first image formation unit 10 (i.e., white or clear as the special color) at this time on the setting screen through manipulation panel 4. Setting unit 61 then detects an image formation method (i.e., any of the first image formation method and the second image formation method) to be used in the formation of a print image and the types of the ground color and the upper color. Then, setting unit 61 makes a setting such that all parts of first spread-out correction unit 60 (i.e., boundary correction area detector 62, first edge-portion correction area detector 63, and first correction processor 64) execute a processing according to the image formation method and the types of the ground color and the upper color thus detected. In this event, setting unit 61 also sets first image input unit 52 to generate print image data of a print image represented with the types of ground color and the upper color thus detected. Incidentally, setting unit 61 is capable of detecting an image formation method and the types of the ground color and the upper color not only upon input on the setting screen as described above, but also, for example, upon notification from an information processing device connected to color printer 1, such as a personal computer, if the image data of an image to be printed is given from the image processing device to first image input unit 52. Note that, hereinbelow, print image data generation processing and first image processing applied to the print image data that are executed when a print image in which white serves as the ground color is formed on a surface of a plain paper sheet as print medium 5 according to the setting made by setting unit 61 are described specifically. Then described are the print image data generation processing and first image processing applied to the print image data that are executed when a print image in which white serves as the ground color is formed on a surface of a transfer paper sheet as print medium 5 according to the setting made by setting unit 61, and the print image data generation processing and first image processing applied to the print image data that are executed when a print image in which the base colors serve as the ground color (that is, the color of clear serves as the upper color) is formed on a surface of a plain paper sheet as print medium 5 according to the setting made by setting unit 61. The events are described in this order.

In the case where a print image, in which white serves as the ground color, is formed on the surface of a plain paper sheet, upon loading image data of an image to be printed from the outside, first image input unit 52 generates print image data of the print image represented with the colors of cyan, magenta, yellow, black, and white based on the loaded image data. In this event, first image input unit 52 stores, in the print image data for every pixel of the print image, five kinds of pixel values represented by normalizing the densities of cyan, magenta, yellow, black, and white into values from "0" to "255" respectively based on the pattern of the print image. In fact, the pixel value of cyan for each pixel becomes "0" when the color of cyan is not used to represent the pixel, and becomes a value larger than "0" according to its density when the color of cyan is used to represent the pixel. The same holds for the pixel values of magenta, yellow, black, and white for each pixel. Note, however, that, in order to make white serve as the ground color only for a base color portion in the print image, for every pixel of the print image, first image input unit 52 sets the pixel value of white at a value larger than "0," more preferably at "255" indicating the highest density for the purpose of fully exploiting its function as the ground color if at least one of the pixel values of cyan, magenta, yellow, and black is equal to a value larger than "0," and sets the pixel value of white at "0" if all of the pixel values of cyan, magenta, yellow, and black are equal to "0." Accordingly, in the print image, a colored area is an area including only pixels in each of which the pixel value of white is larger than "0" and at least one of the pixel values of cyan, magenta, yellow, and black is larger than "0." Further, in the print image, a colorless area is an area including only pixels in each of which all the pixel values of cyan, magenta, yellow, black, and white are equal to "0." First image input unit 52 generates the print image data in this manner and sends it to boundary correction area detector 62.

Figure 4:
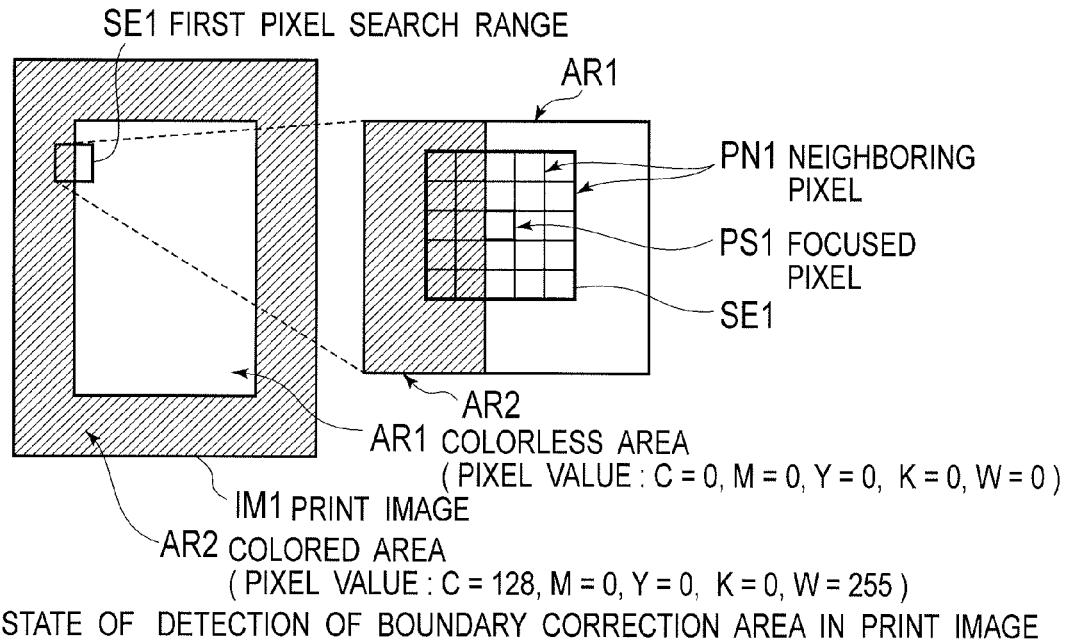
FIG. 4 is a schematic diagram for explaining the detection of a boundary correction area of a print image.

Upon receiving the print image data from first image input unit 52, boundary correction area detector 62 retrieves first pixel search range information from storage unit 51 and executes boundary correction area detection processing according to the setting made by setting unit 61. In this event, as illustrated in FIG. 4, while shifting first pixel search range SE1 in the main-scanning direction or in the sub-scanning direction sequentially on a pixel-by-pixel basis on print image IM1 which is based on the print image data, boundary correction area detector 62 makes every pixel in print image IM1 positioned at the center of first pixel search range SE1 sequentially one at a time to designate the pixel as focused pixel P51. First pixel search range SE1 is indicated by the first pixel search range information and is formed of a square of five pixels (in the main-scanning direction)×five pixels (in the sub-scanning direction), for example. In addition, every time boundary correction area detector 62 designates each pixel as focused pixel PS1 on print image IM1 one at a time, it judges whether or not both conditions where focused pixel PS1 is a pixel of colorless area AR1 and where at least one of pixels PN1 located around focused pixel PS1 in first pixel search range SE1 (hereinafter, such pixels are also referred to as neighboring pixels) is a pixel of colored area AR2 are satisfied on the basis of the five kinds of pixel values of focused pixel PS1 and the five kinds of pixel values of each of neighboring pixels PN1. As a result of the judgment, if focused pixel PS1 is a pixel of colored area AR1 and at least one of neighboring pixels PN1 is a pixel of colored area AR2, boundary correction area detector 62 judges that focused pixel PS1 at this time is a pixel to be corrected for boundary correction (hereinafter, such pixel is also referred to as a boundary correction pixel). In contrast, if focused pixel PS1 is a pixel of colorless area AR1 but all of neighboring pixels PN1 are pixels in colorless area AR1 as well, boundary correction area detector 62 judges that focused pixel PS1 at this time is a pixel not to be corrected (non-correction pixel). Further, if all of focused pixel PS1 and neighboring pixels PN1 are pixels in colored area AR2, boundary correction area detector 62 judges that focused pixel PS1 at this time is a non-correction pixel as in the above case. In this manner, based on the judgment result, boundary correction area detector 62 detects a boundary area to be corrected (boundary correction area) which is a boundary portion between colorless area AR1 and colored area AR2 in print image IM1 and is formed of boundary correction pixels. Note that boundary correction area detector 62 generates boundary correction area detection data indicating a boundary correction area while judging, one at a time, whether each of pixels in print image IM1 is a boundary correction pixel or a non-correction pixel. Specifically, boundary correction area detector 62 stores data in the boundary correction area detection data such that it associates a value of "1" indicating a boundary correction pixel with a pixel in print image IM1 if judging that the pixel is a boundary correction pixel, and such that it associates a value of "0" indicating a non-correction pixel with a pixel in print image IM1 if judging that the pixel is a non-correction pixel. Upon detecting a boundary correction area, boundary correction area detector 62 sends first edge-portion correction area detector 63 the boundary correction area detection data together with the print image data.

Figure 5:
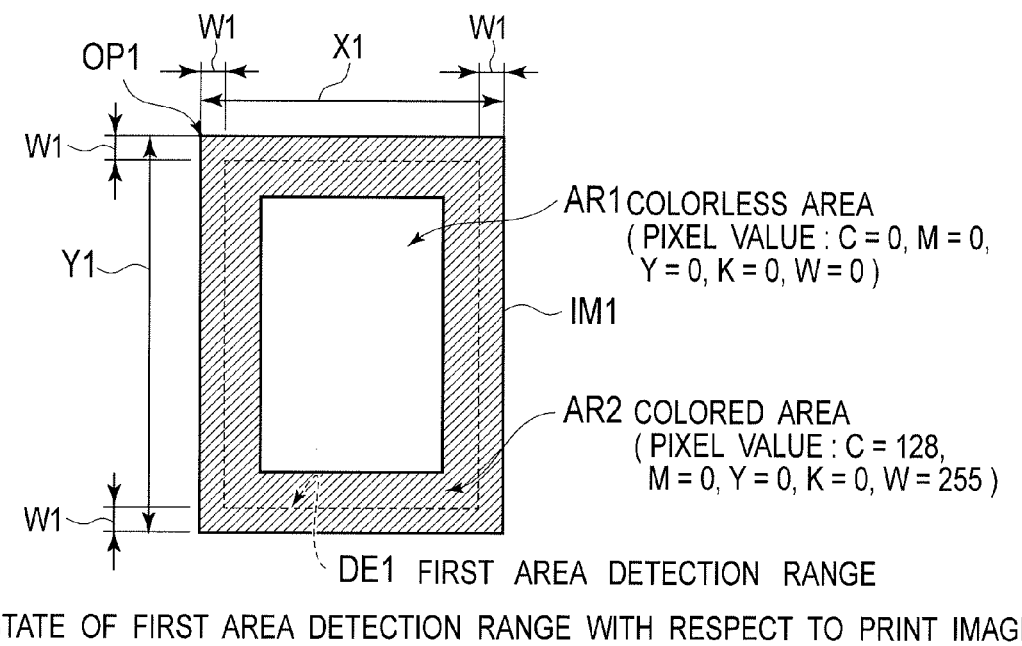
FIG. 5 is a schematic diagram for explaining a first area detection range with respect to a print image.

Upon receiving the boundary correction area detection data together with the print image data from boundary correction area detector 62, first edge-portion correction area detector 63 retrieves first area detection range information from storage unit 51 and executes first edge-portion correction area detection processing according to the setting made by setting unit 61. In this event, as illustrated in FIG. 5, first edge-portion correction area detector 63 designates every pixel in print image IM1 based on the print image data as a focused pixel sequentially one at a time. Then, every time first edge-portion correction area detector 63 designates each pixel as a focused pixel on print image IM1 one at a time, it judges whether or not the focused pixel is a pixel of colored area AR2 and also whether or not the focused pixel is a pixel within first area detection range DE1 on the basis of first area detection range DE1 and the five kinds of pixel values of the focused pixel, first area detection range DE1 being indicated by the first area detection range information and having left/right strip-shaped portions of the same width and top/bottom strip-shaped portions of the same width, for example. Note that first edge-portion correction area detector 63 may judge that a focused pixel is a pixel within first area detection range DE1 if the coordinates of the focused pixel satisfy at least one of four kinds of conditions represented by the following formulae (1) to (4):

$$x < W1 \qquad (1);$$

$$y < W1 \qquad (2);$$

$$x \geq X1 - W1 \qquad (3); \text{ and}$$

Figure 6:
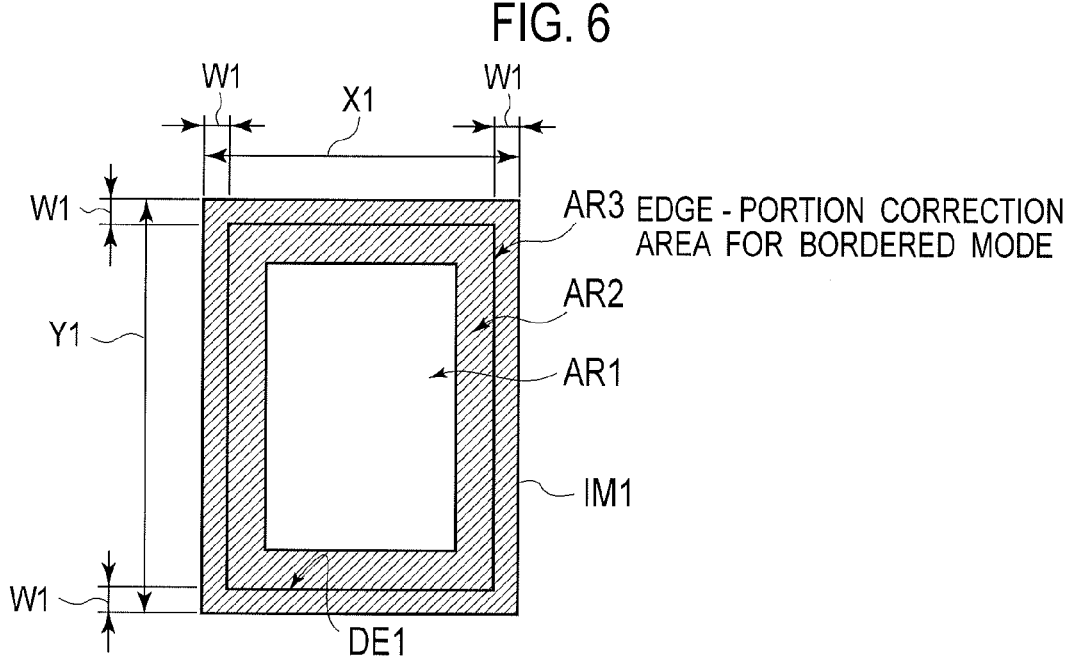
FIG. 6 is a schematic diagram for explaining the detection of an edge-portion correction area for a bordered mode of a print image.

$y \geq Y1 - W1$ (4), where: X1 and Y1 indicate the horizontal size and the vertical size of print image IM1 represented with the number of pixels in the main-scanning direction and in the sub-scanning direction, respectively, with the left upper corner of the print image used as point of origin OP1 (0, 0). W1 indicates the width of each of the left/right strip-shaped portions and the top/bottom strip-shaped portions of first area detection range DE1 represented by the number of pixels thereof; and (x, y) indicates the coordinates of the focused pixel. Then, as illustrated in FIG. 6, if the focused pixel is a pixel of colored area AR2 and is also a pixel within first area detection range DE1, first edge-portion correction area detector 63 judges that this focused pixel is a pixel to be corrected for image edge-portion correction (hereinafter, such pixel is also referred to as an edge-portion correction pixel). In contrast, if the focused pixel is a pixel of colorless area AR1, first edge-portion correction area detector 63 judges that this focused pixel is a non-correction pixel irrespective of whether or not this focused pixel is a pixel within first area detection range DE1. Further, if the focused pixel is a pixel of colored area AR2 but is a pixel outside first area detection range DE1, first edge-portion correction area detector 63 also judges that this focused pixel is a non-correction pixel. In this manner, based on the judgment result, first edge-portion correction area detector 63 detects the edge-portion correction area for bordered mode AR3, which extends along the edges of the image formed by edge-portion correction pixels, in colored area AR2 located in left/right edge portions and top/bottom edge portions of print image IM1. Incidentally, FIG. 6 illustrates an example where all of the image left/right edge portions and the image top/bottom edge portions are colored area AR2 and thus first area detection range DE1 overlapping these portions are detected directly as an edge-portion correction area for bordered mode AR3. Note that first edge-portion correction area detector 63 generates edge-portion correction area detection data indicating an edge-portion correction area for bordered mode AR3 while judging, one at a time, whether each of the pixels in print image IM1 is an edge-portion correction pixel or a non-correction pixel. Specifically, first edge-portion correction area detector 63 stores data in the edge-portion correction area detection data such that it associates a value of "1" indicating an edge-portion correction pixel with a pixel in print image IM1 if judging that the pixel is an edge-portion correction pixel. It associates a value of "0" indicating a non-correction pixel with a pixel in print image IM1 if judging that the pixel is a non-correction pixel. Upon detecting an edge-portion correction area for bordered mode AR3, first edge-portion correction area detector 63 sends first correction processor 64 the edge-portion correction area detection data together with the print image data and the boundary correction area detection data.

Figure 7:
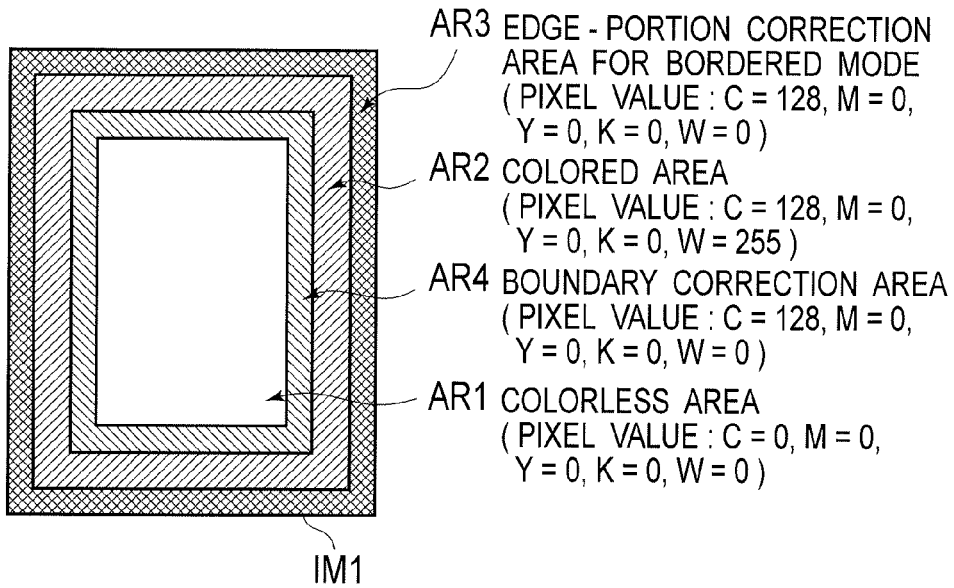
FIG. 7 is a schematic diagram for explaining a first correction processing performed on a print image.

Upon receiving the boundary correction area detection data and the edge-portion correction area detection data together with the print image data from first edge-portion correction area detector 63, first correction processor 64 retrieves first pixel search range information from storage unit 51 and executes first correction processing according to the setting made by setting unit 61. In this event, as illustrated in FIG. 7, while shifting first pixel search range SE1 (not illustrated in FIG. 7) indicated by the first pixel search range information in the main-scanning direction or in the sub-scanning direction sequentially on a pixel-by-pixel basis on print image IM1 which is based on the print image data, first correction processor 64 designates every pixel in print image IM1 as focused pixel PS1 at the center of first pixel search range SE1 sequentially one at a time, for example. In addition, every time first correction processor 64 designates each pixel as a focused pixel PS1 on print image IM1 one at a time, it judges whether or not focused pixel PS1 is an edge-portion correction pixel and whether or not the focused pixel is a boundary correction pixel on the basis of the edge-portion correction area detection data and the boundary correction area detection data. As a result of the judgment, if focused pixel PS1 is an edge-portion correction pixel, first correction processor 64 replaces, with "0," only the pixel value of white out of the five kinds of pixel values of this focused pixel PS1 (i.e., edge-portion correction pixel). Meanwhile, if focused pixel PS1 is a boundary correction pixel, out of the pixel values exclusive of the pixel value of white among the five kinds of pixel values of focused pixel PS1 (i.e., boundary correction pixel), first correction processor 64 changes the pixel value of cyan from its original value of "0" to the largest value among the pixel values of cyan that neighboring pixels PN1 in first pixel search range SE1 respectively have. In the same way, first correction processor 64 changes each of the pixel values of magenta, yellow, and black that this focused pixel PS1 (i.e., a boundary correction pixel) has from its original value of "0" to the largest value among the pixel values of the corresponding color that neighboring pixels PN1 in first pixel search range SE1 respectively have. Note that, if focused pixel PS1 is a non-correction pixel (that is, focused pixel PS1 is neither an edge-portion correction pixel nor a boundary correction pixel), first correction processor 64 leaves the five kinds of pixel values of this focused pixel PS1 unchanged.

Thereby, first correction processor 64 can correct print image IM1 so that edge-portion correction area for bordered mode AR3 extending along the edges of print image IM1 may be represented only with the upper color, and thus, in an edge portion of print image IM1, it can make the width of the ground color narrower than the width of the upper color, laid over the ground color, such that the area of the ground color retreats toward the center of the image from the image edges. In addition, first correction processor 64 can correct print image IM1 so that boundary correction area AR4 in a central portion of print image IM1 may be represented only with the upper color, and thus it can make the width of the upper color wider than the width of the ground color laid under the upper color in a central portion of print image IM1. Then, first correction processor sends the print image data of print image IM1, whose edge-portion correction area for bordered mode AR3 and boundary correction area AR4 are corrected, to output image processor 65 as corrected print image data. Incidentally, upon receipt of the corrected print image data from first correction processor 64, output image processor 65 performs a predetermined processing, such as a tone correction processing and a value reduction processing using a dithering technique, an error diffusion technique, or the like, on the corrected print image data, and sends the resultant data to subsequent head controller 53.

Figure 8:
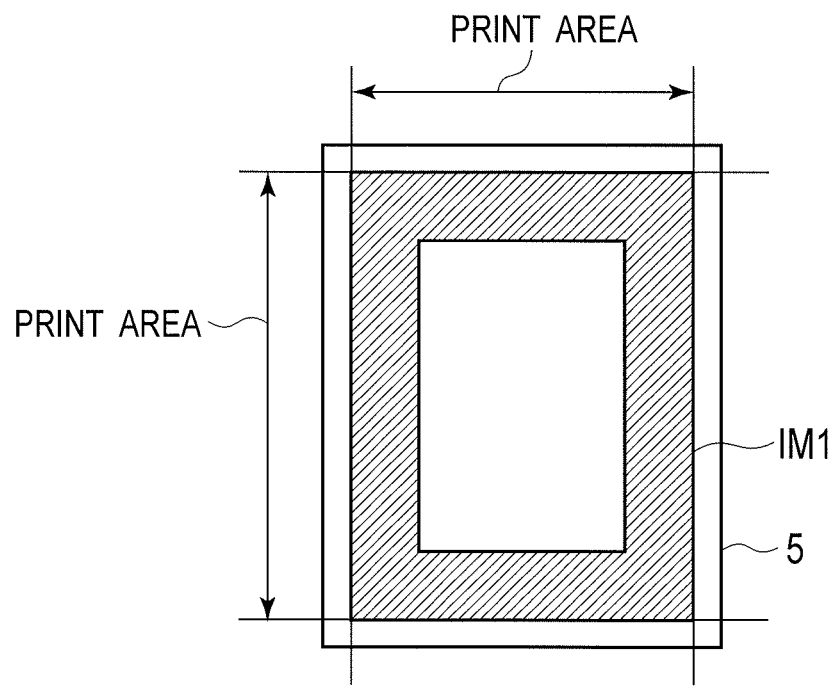
FIG. 8 is a schematic diagram for explaining the formation of a print image on a surface of a print medium based on corrected print image data.
Figure 9A:
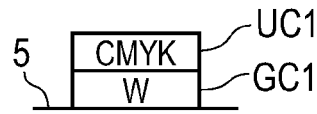
FIGS. 9A to 9C are schematic sectional views for explaining the misregistration of a ground color and an upper color in the case of forming a print image in a conventional color printer.
Figure 9B:
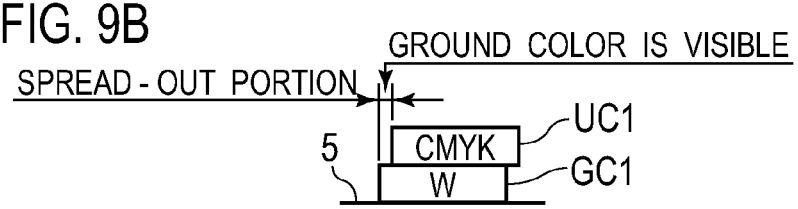
Figure 9C:
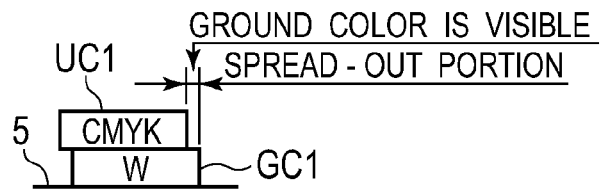
Figure 10A:
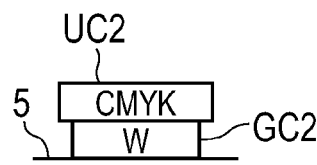
FIGS. 10A to 10C are schematic sectional views for explaining the misregistration of a ground color and an upper color in the case of forming a print image in the color printer according to embodiment 1.
Figure 10B:
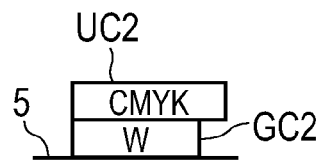
Figure 10C:
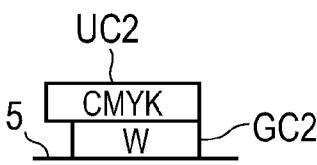

In this manner, as illustrated in FIG. 8, color printer 1 forms print image IM1 in the state where the edge-portion correction area for bordered mode AR3 and boundary correction area AR4 are corrected, in a print area slightly smaller than the surface of print medium 5 and in the bordered printing mode where a fringe portion of the print medium on the surface thereof is entirely left unprinted. In the meantime, a conventional color printer does not perform the first image processing at all on the print image data as done in embodiment 1=. Hence, when a print image in which white serves as ground color GC1 is formed on a surface of print medium 5, for example, upper color UC1 having a width equal to ground color GC1 is laid over the ground color, as illustrated in FIG. 9A. Thus, if upper color UC1 and ground color GC1 laid one over another in a print image on print medium 5 are misaligned with each other in the conventional color printer, ground color GC1 spreads out from under upper color UC1, as illustrated in FIGS. 9B and 9C. As a result, in the conventional color printer, ground color GC1 which should be originally hidden under upper color UC1 and invisible in the print image turns visible and stands out, which deteriorates the quality of the print image. On the other hand, color printer 1 according to embodiment 1 corrects edge-portion correction area for bordered mode AR3 and boundary correction area AR4 in print image IM1 based on print image data so that, in prospect of such misregistration, the width of upper color UC2 laid over ground color GC2 may be widened relative to the width of ground color GC2, as illustrated in FIG. 10A. Thus, when print image IM1 in which white serves as ground color GC2 is formed on a surface of print medium 5 in color printer 1, for example, it is possible to lay upper color UC2 with a width wider than ground color GC2 over the ground color. By doing so, even if upper color UC2 and ground color GC2 laid one over another in print image IM1 on print medium. 5 are misaligned with each other in color printer 1, it is possible to prevent ground color GC2 from spreading out from under upper color UC2, as illustrated in FIGS. 10B and 10C. Accordingly, in color printer 1, ground color GC2 which should be originally hidden under upper color UC2 and invisible in the print image can be kept invisible even when these colors are misaligned with each other, so that the deterioration in the quality of print image IM1 can be prevented.

Next, in the case where print image IM1 in which white as the special color serves as the ground color is formed on a surface of a transfer paper sheet, the configuration of the print image data itself of print image IM1 is no different from the configuration of the print image data described above; thus, upon loading image data of an image to be printed from the outside, first image input unit 52 generates print image data similar to the above print image data based on the loaded image data, and sends it to boundary correction area detector 62. Upon receiving the print image data from first image input unit 52, boundary correction area detector 62 retrieves second pixel search range information from storage unit 51 in this case according to the setting made by setting unit 61, but executes the boundary correction area detection processing as in the above case using the second pixel search range information. Boundary correction area detector 62 thereby detects boundary correction area AR4 in print image IM1 based on the print image data, and sends first edge-portion correction area detector 63 the boundary correction area detection data together with the print image data. Upon receiving the boundary correction area detection data together with the print image data from boundary correction area detector 62, first edge-portion correction area detector 63 retrieves second area detection range information from storage unit 51 in this case according to the setting made by setting unit 61, but executes the first edge-portion correction area detection processing as in the above case using the second area detection range information. First edge-portion correction area detector 63 thereby detects edge-portion correction area for bordered mode AR3 in print image IM1 based on the print image data, and sends first correction processor 64 the edge-portion correction area detection data together with the print image data and the boundary correction area detection data. Upon receiving the boundary correction area detection data and the edge-portion correction area detection data together with the print image data from first edge-portion correction area detector 63, first correction processor 64 retrieves second pixel search range information from storage unit 51, in this case according to the setting made by setting unit 61, but executes the first correction processing as in the above case using the second pixel search area information. First correction processor 64 thereby corrects boundary correction area AR4 as well as edge-portion correction area for bordered mode AR3 of print image IM1. First correction processor 64 then sends the print image data of print image IM1 thus corrected to output image processor 65 as corrected print image data.

In the meantime, when print image IM1 is formed on a surface of a transfer paper sheet in color printer 1 based on the corrected print image data, white having a width narrower than the width of the base colors is laid over the base colors on the transfer paper sheet and hence the base colors spread out from under white. However, if print image IM1 is transferred onto a T-shirt by way of the transfer paper sheet, white serves as the ground color and the base colors, being wider than white, are laid over white as described above. Thereby, in color printer 1, even if the upper color and the ground color laid one over another in print image IM1 on the transfer paper sheet are misaligned with each other, it is possible to prevent the ground color from spreading out from under the upper color in the state where print image IM1 is transferred on a T-shirt. Accordingly, in color printer 1, the ground color which should be originally hidden under the upper color and invisible on a T-shirt being a final target for the formation of print image IM1 can be kept invisible even when these colors are misaligned with each other, so that the deterioration in the quality of print image IM1 can be prevented.

Next, in the case where print image IM1 in which the base colors serve as the ground color (that is, the color of clear as the special color serves as the upper color) is formed on the surface of a plain paper sheet, upon loading image data of an image to be printed from the outside, first image input unit 52 generates print image data of print image IM1 represented with the colors of cyan, magenta, yellow, black, and clear based on the loaded image data. In this event, first image input unit 52 stores, in the print image data for every pixel of print image IM1, five kinds of pixel values represented by normalizing the densities of cyan, magenta, yellow, black, and clear into values from "0" to "255" respectively. Note that, as in the case of the print image in which white serves as the ground color described above, each of the pixel values of cyan, magenta, yellow, and black for each pixel becomes when the corresponding color is not used to represent the pixel, and becomes a value larger than "0" according to its density when the corresponding color is used to represent the pixel. Further, in order to make the color of clear serve as the upper color for glossing the base colors in print image IM1, for every pixel of print image IM1, first image input unit 52 sets the pixel value of clear at a value larger than "0," more preferably at "255" indicating the highest density for the purpose of achieving sufficient gloss if at least one of the pixel values of cyan, magenta, yellow, and black is equal to a value larger than "0," and sets the pixel value of clear at "0" if all of the pixel values of cyan, magenta, yellow, and black are equal to "0." Accordingly, in print image IM1 in which the base colors serve as the ground color, a colored area is an area including only pixels in each of which the pixel value of clear is larger than "0" and at least one of the pixel values of cyan, magenta, yellow, and black is larger than "0," and a colorless area is an area including only pixels in each of which all the pixel values of cyan, magenta, yellow, black, and clear are equal to "0." First image input unit 52 generates the print image data in this manner and sends it to boundary correction area detector 62.

Upon receiving the print image data from first image input unit 52, boundary correction area detector 62 retrieves second pixel search range information from storage unit 51 according to the setting made by setting unit 61 and executes the boundary correction area detection processing as in the above case. Boundary correction area detector 62 thereby detects boundary correction area AR4 in print image IM1 based on the print image data, and sends first edge-portion correction area detector 63 the boundary correction area detection data together with the print image data. Upon receiving the boundary correction area detection data together with the print image data from boundary correction area detector 62, first edge-portion correction area detector 63 retrieves second area detection range information from storage unit 51 according to the setting made by setting unit 61 and executes the first edge-portion correction area detection processing as in the above case. First edge-portion correction area detector 63 thereby detects the edge-portion correction area for bordered mode AR3, which extends along the edges of the image, in print image IM1 based on the print image data, and sends first correction processor 64 the edge-portion correction area detection data together with the print image data and the boundary correction area detection data. Upon receiving the boundary correction area detection data and the edge-portion correction area detection data together with the print image data from first edge-portion correction area detector 63, first correction processor 64 retrieves second pixel search range information from storage unit 51 according to the setting made by setting unit 61 and executes a first correction processing. In this event, as in the above case, while shifting the second pixel search range sequentially on a pixel-by-pixel basis on print image IM1, first correction processor 64 designates every pixel in print image IM1 as a focused pixel sequentially one at a time, and judges whether or not the focused pixel is an edge-portion correction pixel and whether or not the focused pixel is a boundary correction pixel. As a result of the judgment, if the focused pixel is an edge-portion correction pixel, out of the five kinds of pixel values of this focused pixel (i.e., edge-portion correction pixel), first correction processor 64 changes each of the pixel values of cyan, magenta, yellow, and black, excluding the pixel value of clear from its original value larger than "0," to "0" because the base colors serve as the ground color in print image IM1. Thereby, first correction processor 64 can correct print image IM1 so that edge-portion correction area for bordered mode AR3 extending along the edges of print image IM1 may be represented only with the color of clear as the upper color, and thus, in an edge portion of the image, it can make the width of the base colors as the ground color narrower than the width of the color of clear as the upper color, laid over the ground color, such that the area of the ground color retreats toward the center of the image from the image edges. In addition, if the focused pixel is a boundary correction pixel, out of the five kinds of pixel values of this focused pixel (i.e., boundary correction pixel), first correction processor 64 changes only the pixel value of clear from its original value of "0" to a value larger than "0," for example, "255." Thereby, first correction processor 64 can make the width of the color of clear as the upper color wider than the width of the base colors as the ground color laid under the upper color in a central portion of print image IM1. Then, first correction processor 64 sends the print image data of print image IM1 corrected in the above manner to output image processor 65 as corrected print image data. Thus, when print image IM1 represented with the base colors as the ground color and the color of clear as the upper color is formed on the surface of print medium 5 in color printer 1, it is possible to lay the color of clear wider than the ground color laid over the ground color. By doing so, even if the base colors and the color of clear laid one over another in print image IM1 on print medium 5 are misaligned with each other in color printer 1, it is possible to prevent the base colors from spreading out from under the color of clear. Accordingly, in color printer 1, even if the color of clear and the base colors are misaligned with each other in print image IM1, it is possible to avoid the generation of base color portions that cannot be coated with the color of clear and gloss the base colors exactly, and thus to prevent the deterioration in the quality of print image IM1.

(1-3) First Image Processing

Figure 11:
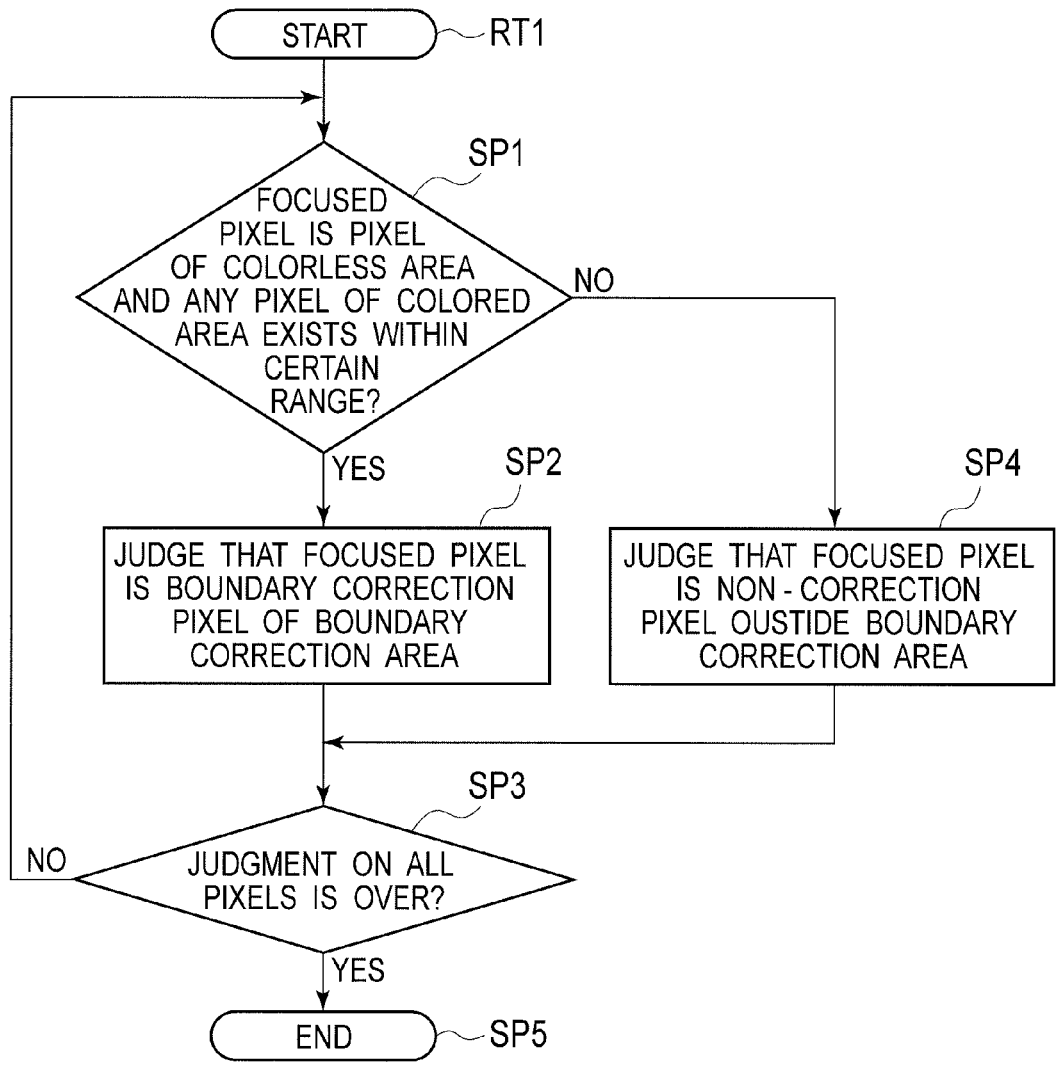
FIG. 11 is a flowchart illustrating a boundary correction area detection processing procedure.
Figure 12:
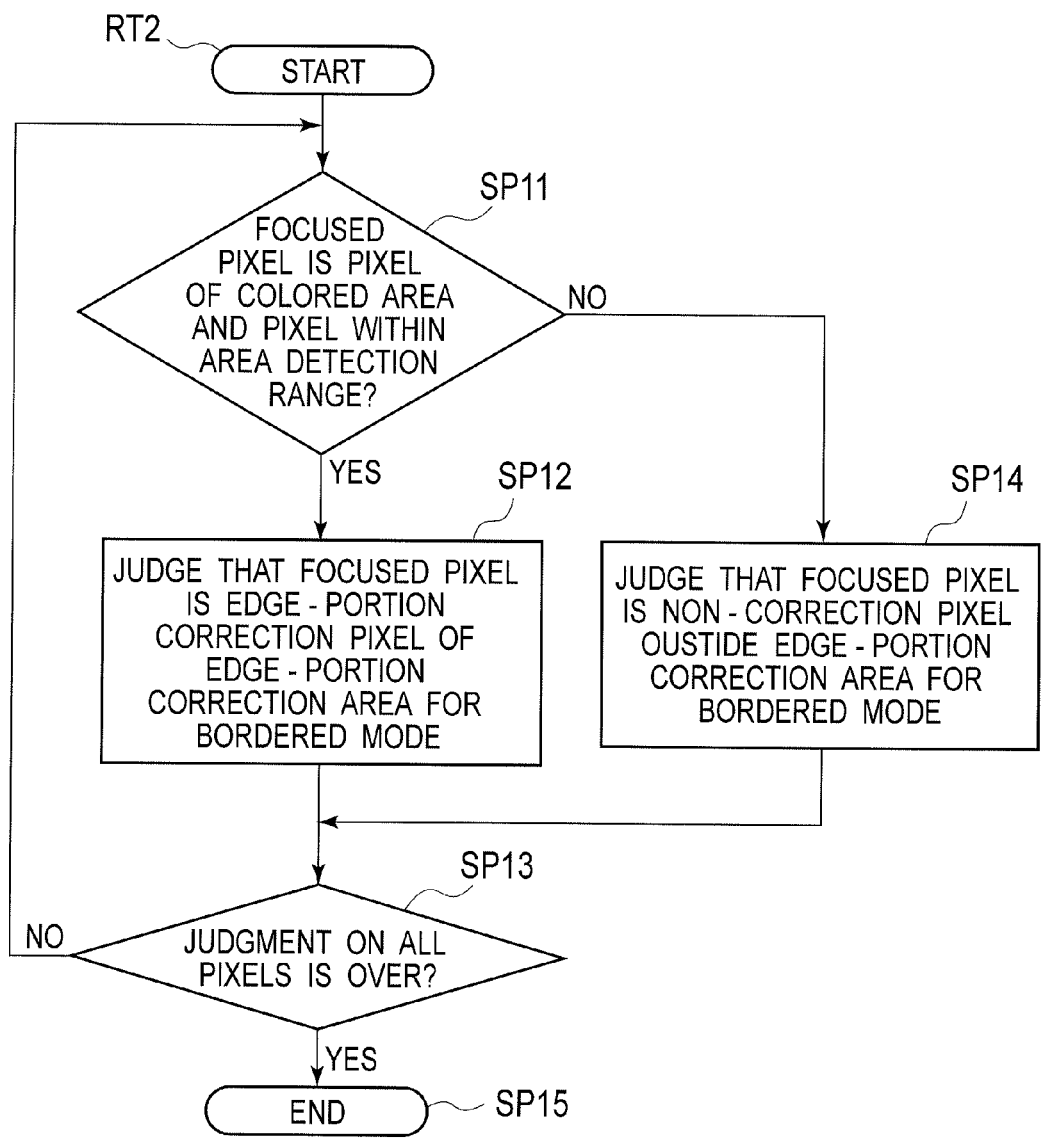
FIG. 12 is a flowchart illustrating a first edge-portion correction area detection processing procedure.
Figure 13:
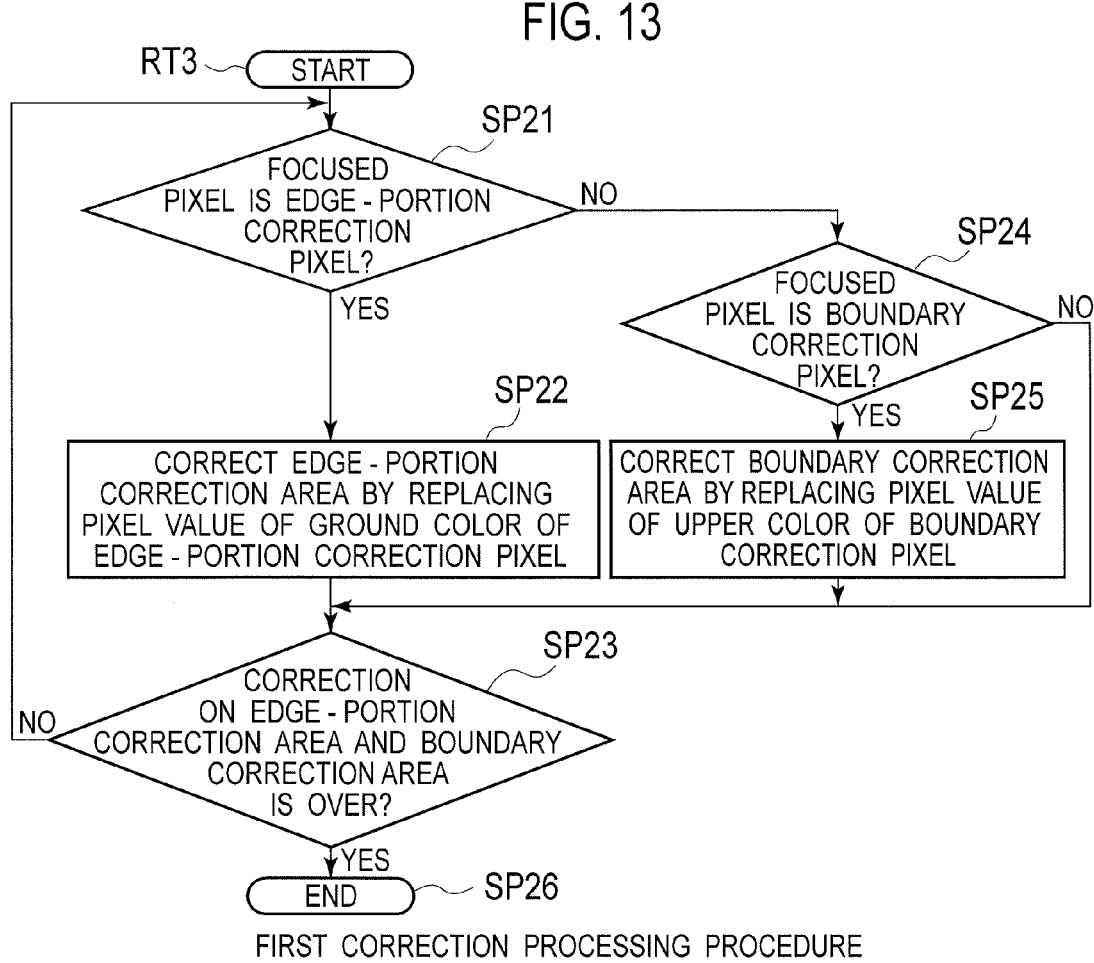
FIG. 13 is a flowchart illustrating a first correction processing procedure.

Next, with the flowcharts illustrated in FIGS. 11 to 13, a description is given of boundary correction area detection processing procedure RT1, first edge-portion correction area detection processing procedure RT2, and first correction processing procedure RT3 that first controller 50 executes as part of a first image processing procedure according to the first image processing program. Upon receiving print image data from first image input unit 52, first controller 50 starts boundary correction area detection processing procedure RT1 illustrated in FIG. 1 according to the first image processing program. Upon starting boundary correction area detection processing procedure RT1, in step SP1, first controller 50 designates one of the pixels in print image IM1 as focused pixel PS1, and judges whether or not both conditions where this focused pixel PS1 is a pixel of colorless area AR1 and where any pixel of colored area AR2 exists within a pixel search range (i.e., among neighboring pixels PN1 in first pixel search range SE1 or the second pixel search range which are located around focused pixel PS1) are satisfied. If a positive result is obtained in step SP1, it indicates that the width of the upper color laid over the ground color can be made wider than the width of the ground color in a central portion of print image IM1 by making such a correction that focused pixel PS1 may be represented with the upper color. Thus, if a positive result is obtained in step SP1, first controller 50 proceeds to step SP2 to judge that this focused pixel PS1 is a boundary correction pixel of boundary correction area AR4, and proceeds to next step sp3. In contrast, if a negative result is obtained in step SP1, it indicates that focused pixel PS1 is a pixel relatively away from a boundary between colorless area AR1 and colored area AR2, and therefore the width of the upper color laid over the ground color cannot be made wider than the width of the ground color in the central portion of print image IM1 even by making such a correction that focused pixel PS1 may be represented with the upper color. Thus, if a negative result is obtained in step SP1, first controller 50 proceeds to step SP4 to judge that this focused pixel PS1 is a non-correction pixel outside boundary correction area AR4, and proceeds to step SP3. In step SP3, first controller 50 judges whether or not the judgment on all the pixels in print image IM1 is over, and goes back to step SP1 if a negative result is obtained. When first controller 50 finishes judging all the pixels in print image IM1 to be either a boundary correction pixel or a non-correction pixel, it detects boundary correction area AR4 based on the judgment result. Then, if a positive result is obtained in step SP3, first controller 50 proceeds to next step SP5 to terminate boundary correction area detection processing procedure RT1.

When first controller 50 finishes boundary correction area detection processing procedure RT1, it subsequently starts first edge-portion correction area detection processing procedure RT2 illustrated in FIG. 12 according to the first image processing program. Upon starting first edge-portion correction area detection processing procedure RT2, in step SP11, first controller 50 designates one of the pixels in print image IM1 as a focused pixel, and judges whether or not this focused pixel is a pixel of colored area AR2 and also a pixel within an area detection range (i.e., first area detection range DE1 or the second area detection range) extending along the edges of the image. If a positive result is obtained in step SP11, it indicates that the width of the ground color can be made narrower than the width of the upper color, laid over the ground color, in an edge portion of print image IM1 such that the area of the ground color retreats toward the center of the image from the image edges by making such a correction that the focused pixel may be represented with the upper color. Thus, if a positive result is obtained in step SP11, first controller 50 proceeds to step SP12 to judge that this focused pixel is an edge-portion correction pixel of the edge-portion correction area for bordered mode AR3, and proceeds to next step SP13. In contrast, if a negative result is obtained in step SP11, it indicates that the focused pixel is a pixel relatively away from the edge portion of print image IM1, and therefore the width of the ground color cannot be made narrower than the width of the upper color, laid over the ground color, in the edge portion of print image IM1 such that the area of the ground color retreats toward the center of the image from the image edges even if such a correction is made that the focused pixel may be represented with the upper color. Thus, if a negative result is obtained in step SP11, first controller 50 proceeds to step SP14 to judge that this focused pixel is a non-correction pixel outside the edge-portion correction area for bordered mode AR3, and proceeds to step SP13. In step SP13, first controller 50 judges whether or not the judgment on all the pixels in print image IM1 is over, and goes back to step SP11 if a negative result is obtained. When first controller 50 finishes judging all the pixels in print image IM1 to be either an edge-portion correction pixel or a non-correction pixel, it detects the edge-portion correction area for bordered mode AR3 based on the judgment result. Then, if a positive result is obtained in step SP13, first controller 50 proceeds to next step SP15 to terminate first edge-portion correction area detection processing procedure RT2.

When first controller 50 finishes first edge-portion correction area detection processing procedure RT2, it subsequently starts first correction processing procedure RT3 illustrated in FIG. 13 according to the first image processing program. Upon starting first correction processing procedure RT3, in step SP21, first controller 50 designates one of the pixels in print image IM1 as focused pixel PS1, and judges whether or not this focused pixel PS1 is an edge-portion correction pixel. If a positive result is obtained, first controller 50 proceeds to step SP22 to correct the edge-portion correction area for bordered mode AR3 such that the pixel value of the ground color of the edge-portion correction pixel is replaced with "0," and then proceeds to the next step SP23. In contrast, if focused pixel PS1 is any of a boundary correction pixel and a non-correction pixel, and thus a negative result is obtained in step S21, first controller 50 proceeds to step SP24 to judge whether or not this focused pixel PS1 is a boundary correction pixel. If a positive result is obtained in SP24, first controller 50 proceeds to step SP25 to correct boundary correction area AR4 such that the pixel value of the upper color of the boundary correction pixel is replaced with a value larger than "0," and then proceeds to next step SP23. On the other hand, if focused pixel PS1 is a non-correction pixel which should be excluded from the correction target and a negative result is obtained in step SP23, first controller 50 proceeds to step SP23. In step SP23, first controller 50 judges whether or not the correction on the edge-portion correction area for bordered mode AR3 and boundary correction area AR4 in print image IM1 is over. If a negative result is obtained in step SP23 because there is a pixel not yet judged to be an edge-portion correction pixel nor judged to be a boundary correction pixel or not and therefore the correction on edge-portion correction area for bordered mode AR3 and boundary correction area AR4 is not over, first controller 50 goes back to step SP21. Then, if a positive result is obtained in step SP23 because the correction on edge-portion correction area for bordered mode AR3 and boundary correction area AR4 is over, first controller 50 proceeds to next step SP26 to terminate first correction processing procedure RT3.

(1-4) Operation and Effect of Embodiment 1

In color printer 1 having the above configuration, first controller 50 loads print image data, and detects the edge-portion correction area for bordered mode AR3 in an edge portion of print image IM1 based on the print image data. The edge-portion correction area for bordered mode extends along the edges of the image represented with the ground color and the upper color laid one over another. Then, in color printer 1, first controller 50 corrects print image IM1 based on the print image data so that edge-portion correction area for bordered mode AR3 may be represented only with the upper color, and thereby generates corrected print image data.

With the above configuration, color printer 1 can make the width of the ground color narrower than the width of the upper color, laid over the ground color, in the edge portion of print image IM1 based on the print image data such that the area of the ground color retreats toward the center of the image from the image edges. Accordingly, even if the ground color and the upper color laid one over another are misaligned with each other in an edge portion of the image when print image IM1 is formed on a surface of print medium 5 in color printer 1, it is possible to avoid a situation where the ground color spreads out from under the upper color on the surface of print medium 5 (or on a T-shirt on which print image IM1 is eventually formed), that is, avoid a visible misregistration of the upper color and the ground color, and thus to prevent the deterioration in the quality of print image IM1.

In addition, in color printer 1, first controller 50 detects boundary correction area AR4 adjacent to colored area AR2 in a central portion of print image IM1 based on print image data, and corrects boundary correction area AR4 so that this area may be represented with the upper color. By doing so, color printer 1 can make the width of the upper color in colored area AR2 wider than the width of the ground color laid under the upper color in the central portion of print image IM1 based on the print image data. Accordingly, in color printer 1, it is also possible to avoid a situation where the ground color spreads out from under the upper color in a central portion of print image IM1 when print image IM1 is formed on a surface of print medium 5, and thus to prevent the deterioration in the quality of print image IM1 further reliably. Moreover, in color printer 1, first controller 50 corrects boundary correction area AR4 such that, for each pixel of boundary correction area AR4, the pixel value of the upper color that this pixel has is replaced with the largest value among the pixel values of the upper color that pixels in a pixel search range, including the pixel as a center pixel, respectively have. Accordingly, in a central portion of the image, color printer 1 can expand a portion of colored area AR2, being a boundary with colorless area AR1, while hardly changing the color thereof. Thus, color printer 1 can also prevent the deterioration in the image quality which would otherwise be caused if the upper color portion of colored area AR2 expanded by the correction on boundary correction area AR4 turns to a color significantly different from its original color.

Moreover, color printer 1 stores first area detection range DE1 in storage unit 51 as first area detection range information, first area detection range DE1 having a width assigned according to the amount of the first misregistration of the ground color and the upper color in the case of forming print image IM1 on a surface of print medium 5 with the first image formation method, and stores a second area detection range in storage unit 51 as second area detection range information. The second area detection range has a width assigned according to the amount of the second misregistration of the ground color and the upper color in the case of forming print image IM1 on a surface of print medium 5 with the second image formation method. Further, when color printer 1 forms print image IM1 with the first image formation method, first controller 50 detects the edge-portion correction area for bordered mode AR3 in first area detection range DE1 extending along the edges of the image. and corrects it in print image IM1 based on the print image data. Furthermore, when color printer 1 forms print image IM1 with the second image formation method, first controller 50 detects the edge-portion correction area for bordered mode AR3 in the second area detection range extending along the edges of the image and corrects it in print image IM1 based on print image data. Accordingly, irrespective of which of the first image formation method and the second image formation method color printer 1 uses to form print image IM1 on a surface of print medium 5, color printer 1 can narrow the width of the ground color in an edge portion of print image IM1 based on print image data such that the area of the ground color retreats toward the center of the image from the image edges by the amount of correction according to the amount of first misregistration or the amount of second misregistration. Thus, even if the amount of misregistration of the ground color and the upper color varies depending on which method is used to form print image IM1 on a surface of print medium 5, the color printer can adequately avoid a situation where the ground color spreads out from under the upper color in print image IM1 on the surface of print medium 5 (or on a T-shirt on which print image IM1 is eventually formed), and thus prevent the deterioration in the quality of print image IM1.

(2) Embodiment 2

(2-1) Internal Configuration of Color Printer

Next, a description is given of the internal configuration of color printer 70 (FIG. 1) according to embodiment 2. Color printer 70 is not only capable of forming a print image on the surface of print medium 5 in the bordered printing mode, but also capable of forming a print image thereon in the borderless printing mode where the whole front surface of print medium 5 is used as a print area without any border portion left on the surface. Note, however, that, although the circuit configuration of color printer 70, to be described later, differs from the circuit configuration of color printer 1 according to embodiment 1 described above in order to enable the formation of a print image in the borderless printing mode, the internal configuration of color printer 70 is the same as the internal configuration of color printer 1 according to embodiment 1. Accordingly, the internal configuration of color printer 70 according to embodiment 2 is understood with reference to the description on the internal configuration of color printer 1 according to embodiment 1 described with FIG. 1, and is therefore not described here.

(2-2) Circuit Configuration of Color Printer

Figure 14:
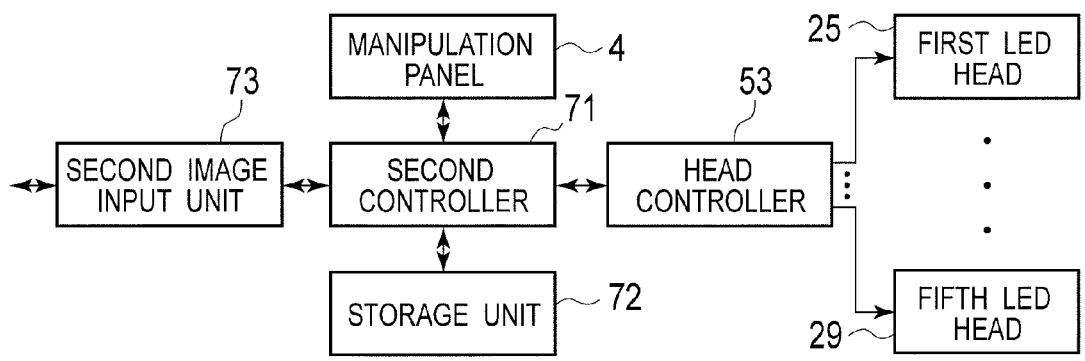
FIG. 14 is a block diagram illustrating the circuit configuration of a color printer according to embodiment 2.

Next, the circuit configuration of color printer 70 is described with FIG. 14 in which portions that are corresponding to those of FIG. 2 are given reference numerals that are the same as those of FIG. 2. Color printer 70 has the same configuration as in the case of embodiment 1 except that second controller 71 such as a CPU or a microprocessor, storage unit 72 such as a hard disc drive or a ROM, and second image input unit 73 are provided in place of first controller 50, storage unit 51, and first image input unit 52 according to embodiment 1 described above. Thus, second controller 71 is configured to load various programs, such as a base program and a variety of application programs previously stored in storage unit 72, from the storage unit to a memory (not illustrated) as appropriate, and expand these in the memory. Further, second controller 71 is configured to exert an overall control on color printer 70 according to the various programs thus developed in the memory, and execute a predetermined arithmetic processing, that includes various processing in response to manipulation commands inputted through manipulation panel 4, and the like. Thereby, second controller 71 can form a print image on a surface of print medium 5.

Meanwhile, second image input unit loads image data of an image to be printed from the outside in the same manner as first image input unit 52 according to embodiment 1. Then, in the case of forming a print image on a surface of print medium 5 in the bordered printing mode, second image input unit 73 generates print image data of the print image having an image size slightly smaller than the size of the print medium for use in bordered printing as in the case of first image input unit 52 described above. Alternatively, in the case of forming a print image on a surface of print medium 5 in the borderless printing mode, second image input unit 73 generates print image data of the print image having an image size slightly larger than the size of the print medium for use in borderless printing, for example. Note that, in the case where a print image is formed on a surface of print medium 5 with the first image formation method, for example, print image data generated by second image input unit 73 for use in borderless printing is assigned, as appropriate, such an image size (hereinafter, such a size is also referred to as a first borderless image size) that an edge portion of the image extends beyond the top and bottom edges and the left and right edges of the surface of print medium 5 by an equal width or different widths according to the amount of first misregistration. Alternatively, in the case where a print image is formed on a surface of print medium 5 with the second image formation method, print image data generated by second image input unit 73 for use in borderless printing is assigned, as appropriate, such an image size (hereinafter, such a size is also referred to as a second borderless image size) that an edge portion of the image extends beyond the top and bottom edges and the left and right edges of the surface of print medium 5 by an equal width or different widths according to the amount of the second misregistration. Note, however, that, since there is tendency that a larger portion of the ground color spreads out from under the upper color with the second image formation method than with the first image formation method as described above, the second borderless image size is assigned so as to be wider than the first borderless image size in at least one of the main-scanning direction and the sub-scanning direction.

Thus, in storage unit 72, second controller 71 stores the above-mentioned first pixel search range information and second pixel search range information, and stores the above-mentioned first area detection range information and second area detection range information for use in processing print image data for bordered printing. In addition, according to the amount of the first misregistration, the first borderless image size, and the size of the medium (medium size), color printer 70 assigns, as appropriate, a third area detection range being in the shape of a frame going around a print image along the edges of the image, being an area extending beyond print medium 5, and being used to detect an edge-portion area to be corrected in an edge portion of the print image of the first borderless image size (hereinafter, such an area is also referred to as an edge-portion correction area for borderless mode). Likewise, in an edge portion of a print image of the second borderless image size, color printer 70 assigns, as appropriate, a fourth area detection range, which is an area extending beyond print medium 5 and is used to detect an edge-portion correction area for the borderless mode, according to the amount of the second misregistration, the second borderless image size, and the medium size. Note that the third area detection range and the fourth area detection range are each in the shape of a frame whose widths between left/right strip-shaped portions and between top/bottom strip-shaped portions are equal to, or different from, each other as in the case of the first area detection range and the second area detection range, and they are assigned so that the fourth area detection range may be wider than the third area detection range. Thus, in storage unit 72, second controller 71 stores third area detection range information indicating the third area detection range and fourth area detection range information indicating the fourth area detection range. Note that, in storage unit 72, second controller 71 stores first borderless image size information indicating the first borderless image size represented with the number of pixels in the main-scanning direction and in the sub-scanning direction, and also stores second borderless image size information indicating the second borderless image size represented with the number of pixels in the main-scanning direction and in the sub-scanning direction.

Figure 15:
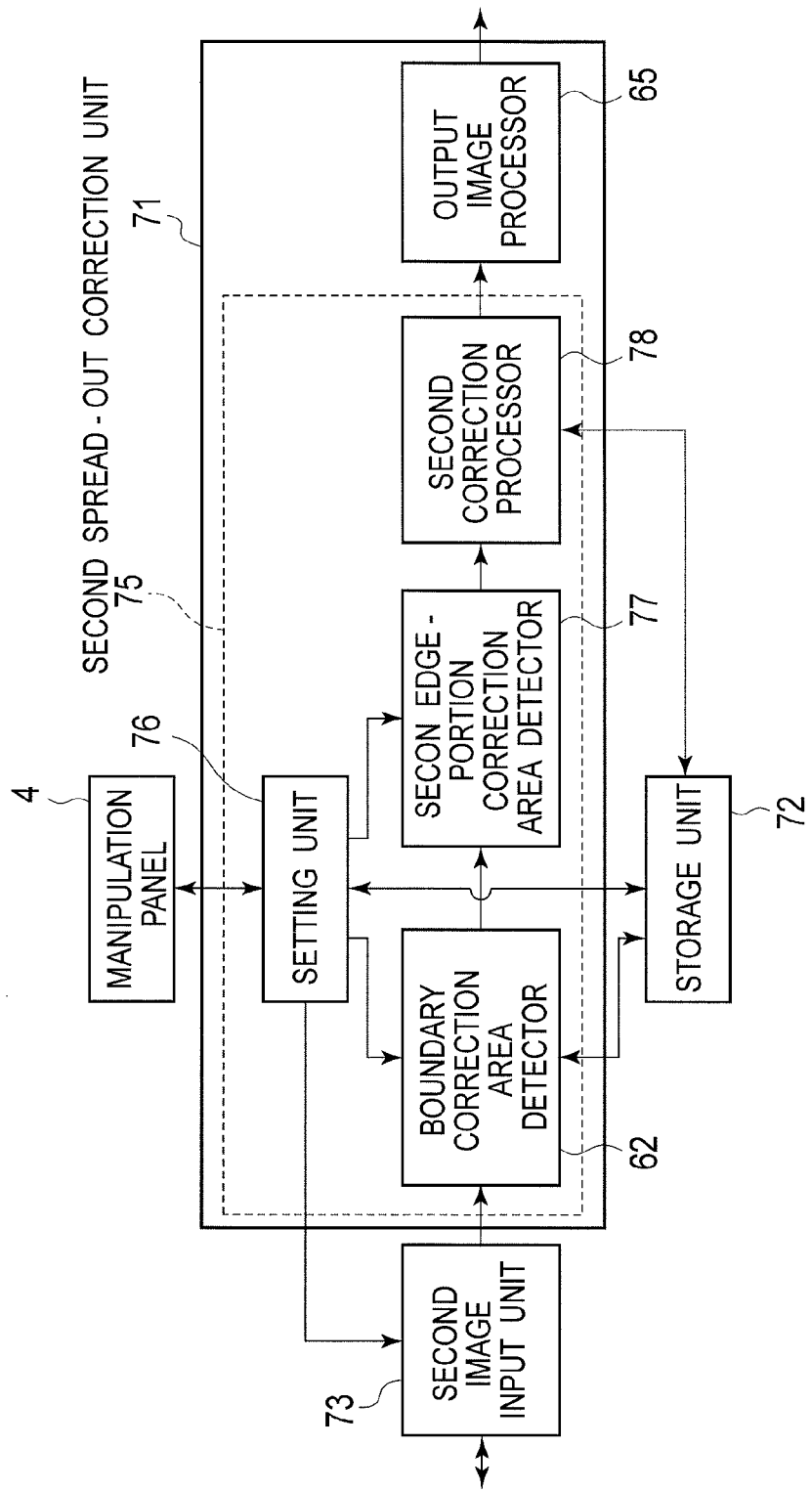
FIG. 15 is a block diagram of functional circuit blocks for explaining a second image processing executed by a second controller.

Storage unit 72 stores therein a second image processing program having a configuration different from the first image processing program according to embodiment 1 described above. With the configuration above, upon receiving print image data from second image input unit 73 in the formation of a print image, second controller 71 executes second image processing by using the first and second pixel search range and the first to fourth detection range as appropriate to prevent the ground color from spreading out from under the upper color throughout the print image (i.e., in an edge portion and a central portion of the image). Thus, with FIG. 15, in which portions that are corresponding to those of FIG. 3 are given reference numerals that are the same as those of FIG. 3, print image data generation processing executed by second image input unit 73 is described specifically below. Besides, while various functions that second controller 71 implements according to the second image processing program are indicated by functional circuit blocks for the sake of convenience, the second image processing that second controller 71 executes according to the second image processing program is described specifically below as the processing executed by the functional circuit blocks.

In this case, in the same manner as setting unit 61 according to embodiment 1 described above, setting unit 76 of second spread-out correction unit 75 detects an image formation method and the type of the ground color and the upper color.

Then, setting unit 76 makes a setting such that all parts of second spread-out correction unit 75 (i.e., boundary correction area detector 62, second edge-portion correction area detector 77, and second correction processor 78) execute processing according to the image formation method and the type of the ground color and the upper color thus detected, and such that second image input unit 73 generates print image data of a print image represented with the ground color and the upper color thus detected. Further, at the time of forming a print image for example, setting unit 76 lets the user direct a printing mode at this time (i.e., either of the bordered printing mode and the borderless printing mode) on a setting screen displayed on manipulation panel 4. Then, if the formation of a print image in the bordered printing mode is directed by the user, setting unit 76 makes a setting such that second image input unit 73 generates print image data for a bordered printing in addition to the above setting. On the other hand, if the formation of a print image in the borderless printing mode is directed by the user, setting unit 76 retrieves first borderless image size information or second borderless image size information from storage unit 72 depending on which image formation method (i.e., the first image formation method and the second image formation method) is used at this time and sends it to second image input unit 73. At the same time, setting unit 76 makes a setting such that second image input unit 73 generates print image data for borderless printing in addition to the above setting. Incidentally, if image data of an image to be printed is given to second image input unit 73 from an information processing device connected to color printer 70, setting unit 76 may direct that the information processing device direct a printing mode besides letting the user direct a printing mode on the setting screen.

Meanwhile, second image input unit 73 generates print image data for bordered printing or print image data for borderless printing according to the setting made by setting unit 76, and sends boundary correction area detector 62 the print image data and printing mode information indicating whether the print image data is for bordered printing or for borderless printing irrespective of whichever print image data is generated. However, second image input unit 73 generates print image data for bordered printing in the same manner as first image input unit 52 according to embodiment 1 described above. Thus, in the following description, only the process of generating print image data for borderless printing is described as to the processing executed by second image input unit 73. In addition, upon receiving print image data and printing mode information from second image input unit 73, boundary correction area detector 62 detects a boundary correction area based on the print image data and sends a boundary correction area detection data to second edge-portion correction area detector 77 together with the print image data and the printing mode information. However, boundary correction area detector 62 executes boundary correction area detection processing as in the case of embodiment 1, described above, irrespective of which of print image data for bordered printing and print image data for borderless printing boundary correction area detector 62 retrieves. Thus, a specific description on the processing of printing boundary correction area detector 62 is omitted. Further, upon retrieving print image data and printing mode information, together with boundary correction area detection data from boundary correction area detector 62, second edge-portion correction area detector 77 judges a printing mode based on the printing mode information. Then, second edge-portion correction area detector 77 executes the same processing as the first edge-portion correction area detection processing executed by first edge-portion correction area detector 63 if the judged printing mode is the bordered printing mode, but executes a processing different from the first edge-portion correction area detection processing if the judged printing mode is the borderless printing mode. Thus, in the following description, as to the processing executed by second edge-portion correction area detector 77, the processing executed when the judged printing mode is the bordered printing mode is not described, and only the processing executed when the judged printing mode is the borderless printing mode is described. Furthermore, second correction processor 78 executes the same processing irrespective of whether the printing mode is the bordered printing mode or the borderless printing mode. Thus, in the following description, as to the processing executed by second correction processor 78, only the processing executed when the printing mode is the borderless printing mode is described, and the processing executed when the printing mode is the bordered printing mode is not described.

In the case where a print image in which white serves as the ground color is formed on a surface of a plain paper sheet in the borderless printing mode, upon loading image data of an image to be printed from the outside, second image input unit 73 generates print image data of the print image having the first borderless image size and represented with the colors of cyan, magenta, yellow, black, and white based on the loaded image data. In this event, for example, for a portion of the print image which entirely overlaps the surface of print medium 5, second image input unit 73 stores, in the print image data for every pixel of that portion, five kinds of pixel values represented by normalizing the densities of cyan, magenta, yellow, black, and white into values from "0" to "255" respectively based on the pattern of the print image, in the same manner as first image input unit 52 according to embodiment 1 described above. On the other hand, for an area of the print image which extends beyond the print medium, second image input unit 73 stores, in the print image data for every pixel of that area, five kinds of pixel values of "0" indicating that none of the colors of cyan, magenta, yellow, black, and white is used for representing the pixel, for example. Second image input unit 73 sends the print image data generated in this manner to boundary correction area detector 62 together with the printing mode information indicating the borderless printing mode applied at this time. Then, upon receiving the boundary correction area detection data together with the print image data and the printing mode information from boundary correction area detector 62, second edge-portion correction area detector 77 executes second edge-portion correction area detection processing and judges a printing mode applied at this time (i.e., the borderless printing mode in this case). In addition, second edge-portion correction area detector 77 retrieves first pixel search range information and third area detection range information from storage unit 72 according to the setting made by setting unit 76 as well as the judgment result. In this event, as illustrated in FIG. 16, while shifting first pixel search range SE1 indicated by the first pixel search range information in the main-scanning direction or in the sub-scanning direction sequentially on a pixel-by-pixel basis on print image IM2 which is based on the print image data, second edge-portion correction area detector 77 makes every pixel in print image IM1 positioned at the center of first pixel search range SE1 sequentially one at a time to designate the pixel as focused pixel P51. In addition, every time second edge-portion correction area detector 77 designates each pixel as a focused pixel PS1 on print image IM1 one at a time, it judges whether or not both conditions where focused pixel PS1 is a pixel of extension area AR5 and where at least one of neighboring pixels PN1 is a pixel of colored area AR2 are satisfied on the basis of a third area detection range (not illustrated) indicated by the third area detection range information and having widths between left/right strip-shaped portions and between top/bottom strip-shaped portions that are equal to each other, for example, and five kinds of pixel values of each of neighboring pixels PN1 in first pixel search range SE1. Note that second edge-portion correction area detector 77 may judge that focused pixel PS1 is a pixel of extension area AR5 being the third area detection range if the coordinates of focused pixel PS1 satisfy at least one of four kinds of conditions represented with the following formulae (5) to (8):

$$x < W2 \quad (5);$$

$$y < W2 \quad (6);$$

$$x \geq X2 - W2 \quad (7); \text{ and}$$

$$y \geq Y2 - W2 \quad (8),$$

where: X2 and Y2 indicate the horizontal size and the vertical size represented with the number of pixels in the main-scanning direction and in the sub-scanning direction, respectively, with the left upper corner of print image IM2 used as the point of origin. W2 indicates the width of each of image left/right edge portions and image top/bottom edge portions of extension area AR5 represented with the number of pixels thereof; and (x, y) indicates the coordinates of focused pixel PS1. Then, if a focused pixel is a pixel of extension area AR5 and at least one of neighboring pixels PN1 is a pixel of colored area AR2, second edge-portion correction area detector 77 judges that this focused pixel PS1 is an edge-portion correction pixel. In contrast, if focused pixel PS1 is a pixel outside extension area AR5, second edge-portion correction area detector 77 judges that this focused pixel PS1 is a non-correction pixel irrespective of whether or not any of neighboring pixels PN1 is a pixel of colored area AR2. Further, if focused pixel PS1 is a pixel of extension area AR5 but all of neighboring pixels PN1 are pixels in colorless area AR1, second edge-portion correction area detector 77 also judges that this focused pixel PS1 is a non-correction pixel. In this manner, based on the judgment result, second edge-portion correction area detector 77 detects an edge-portion correction area for the borderless mode, which is formed of edge-portion correction pixels and adjacent to colored area AR2 on the central side of the image, in extension area AR5 of print image IM2. Note that second edge-portion correction area detector 77 generates edge-portion correction area detection data indicating the edge-portion correction area for the borderless mode while judging, one at a time, whether each of the pixels in print image IM2 is an edge-portion correction pixel or a non-correction pixel. Specifically, second edge-portion correction area detector 77 stores data in the edge-portion correction area detection data such that it associates a value of "2" indicating an edge-portion correction pixel with a pixel in print image IM2 if judging that the pixel is an edge-portion correction pixel, and such that it associates a value of "0" indicating a non-correction pixel with a pixel in print image IM2 if judging that the pixel is a non-correction pixel. Note that second edge-portion correction area detector 77 stores a value of "2," indicating an edge-portion correction pixel of an edge-portion correction area for the borderless mode, in the edge-portion correction area detection data if detecting the edge-portion correction area for the borderless mode in print image IM2 for borderless printing in the above manner, but stores a value of "1," indicating an edge-portion correction pixel of an edge-portion correction area for bordered mode, in the edge-portion correction area detection data if detecting the edge-portion correction area for bordered mode in the print image for bordered printing. Second edge-portion correction area detector 77 thereby makes the edge-portion correction area detection data recognizable as to which of the edge-portion correction area for the bordered mode and the edge-portion correction area for the borderless mode the edge-portion correction area detection data indicates. Then, upon detecting the edge-portion correction area for the borderless mode in this manner, second edge-portion correction area detector 77 sends the edge-portion correction area detection data to second correction processor 78 together with the print image data and the boundary correction area detection data.

Upon receiving the boundary correction area detection data and the edge-portion correction area detection data, together with the print image data from second edge-portion correction area detector 77, second correction processor 78 retrieves first pixel search range information from storage unit 72 and executes second correction processing according to the setting made by setting unit 76. In this event, while shifting first pixel search range SE1 (not illustrated in FIG. 7) indicated by the first pixel search range information in the main-scanning direction or in the sub-scanning direction sequentially on a pixel-by-pixel basis on print image IM2 which is based on the print image data, second correction processor 78 designates every pixel in print image IM2 as a focused pixel PS1 at the center of first pixel search range SE1 sequentially one at a time, for example. In addition, every time second correction processor 78 designates each pixel as a focused pixel PS1 on print image IM2 one at a time, it judges whether or not focused pixel PS1 is an edge-portion correction pixel of the edge-portion correction area for the borderless mode, whether or not the focused pixel is an edge-portion correction pixel of the edge-portion correction area for the bordered mode, and whether or not the focused pixel is a boundary correction pixel of the boundary correction area. As a result of the judgment, if focused pixel PS1 is an edge-portion correction pixel of the edge-portion correction area for the borderless mode, second correction processor 78 changes the pixel value of white that this focused pixel PS1 (i.e., boundary correction pixel) has from its original value of "0" to the largest value among the pixel values of white that neighboring pixels PN1 in first pixel search range SE1 respectively have. In the same way, second correction processor 78 changes each of the pixel values of cyan, magenta, yellow, and black that this focused pixel PS1 (i.e., boundary correction pixel) has from its original value of "0" to the largest value among the pixel values of the corresponding color that neighboring pixels PN1 in first pixel search range SE1 respectively have. Note that, if focused pixel PS1 is a boundary correction pixel, second correction processor 78 changes the pixel values of cyan, magenta, yellow, and black except for the pixel value of white among the five kinds of pixel values of this focused pixel PS1 (i.e., boundary correction pixel) in the same manner as first correction processor 64 according to embodiment 1 described above. On the other hand, if focused pixel PS1 is a non-correction pixel (that is, focused pixel PS1 is neither an edge-portion correction pixel nor a boundary correction pixel), second correction processor 78 leaves the five kinds of pixel values of this focused pixel PS1 unchanged. Incidentally, second correction processor 78 corrects an edge-portion correction pixel in the above manner when receiving print image data for borderless printing from second edge-portion correction area detector 77, but processes an edge-portion correction pixel in the same manner as first correction processor 64 according to embodiment 1 described above when receiving print image data for bordered printing from second edge-portion correction area detector 77. In this manner, second correction processor 78 corrects print image IM2 for borderless printing so that the edge-portion correction area for the borderless mode extending along the edges of the image may be represented with the ground color and the upper color laid one over another, and thus widens the width of colored area AR2 in the edge portion of the image such that colored area AR2 expands toward the edges of the image from an area having the medium size in the image. Then, second correction processor 78 sends the print image data of print image IM2 thus corrected to output image processor 65 as corrected print image data.

Figure 17A:
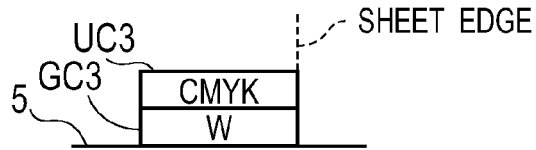
FIGS. 17A to 17C are schematic sectional views for explaining the misregistration of a ground color and an upper color in the case of forming a print image in a conventional color printer.
Figure 17B:
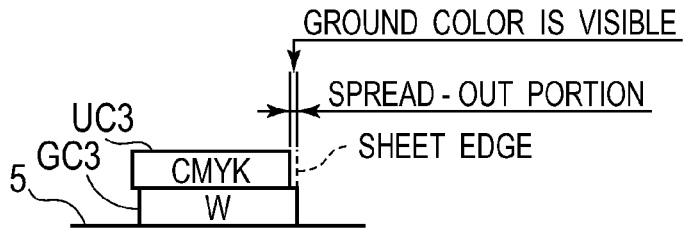
Figure 17C:
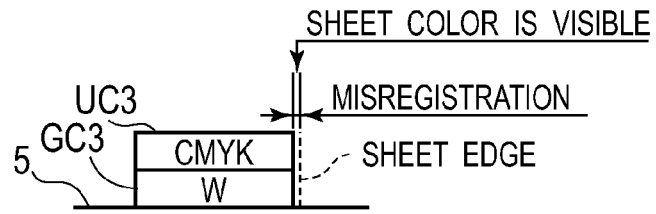
Figure 18A:
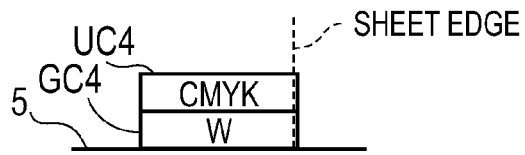
FIGS. 18A to 18C are schematic sectional views for explaining the misregistration of a ground color and an upper color in the case of forming a print image in the color printer according to embodiment 2.
Figure 18B:
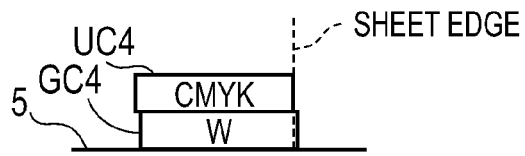
Figure 18C:
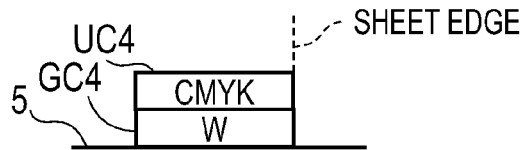

Thereby, color printer 70 can form print image IM2, whose edge-portion correction area for the borderless mode and boundary correction area are corrected, in the borderless printing mode on the entire surface of print medium 5 on the basis of the corrected print image data. Note that, in this event, an edge portion of a toner image is left un-transferred on the surface of transfer belt 33 when transfer unit 15 transfers the toner image onto the surface of print medium 5 from the surface of transfer belt 33 in color printer 70 because the first borderless image size of print image IM2 based on the corrected print image data is larger than the medium size. However, such residual toner can be removed with cleaning blade 40. Meanwhile, when forming a print image on a surface of print medium 5 in the borderless printing mode, a conventional color printer generates print image data of the print image having an image size equal to the medium size. Thus, as illustrated in FIG. 17A, as long as the conventional color printer can form a print image on a surface of print medium 5 such as a plain paper sheet without any misalignment of the print image itself relative to the surface, for example, it is possible to lay ground color GC3 and upper color UC3 of the same width one over another in a colored area in an edge portion of the image while aligning them along an edge of the sheet. However, as illustrated in FIG. 17B, because the conventional color printer does not perform the second image processing as in embodiment 2 on print image data at all, ground color GC3 spreads out from under upper color UC3 if ground color GC3 and upper color UC3 laid one over another are misaligned with each other in the colored area in the edge portion of the image, which deteriorates the quality of the print image. Further, as illustrated in FIG. 17C, if the print image itself is misaligned relative to the surface of print medium 5 in the conventional color printer, ground color GC3 and upper color UC3 are moved away from the edge of the sheet and the color of the sheet (i.e., the color of print medium 5) turns visible in addition to the upper color, which still deteriorates the quality of the print image. On the other hand, color printer 70 according to embodiment 2 generates print image data of print image IM2 of the first borderless image size larger than the medium size, and corrects an edge-portion correction area for the borderless mode, extending along the edges of the image, in print image IM2 based on the print image data to widen the width of colored area AR2 in an edge portion of the image such that colored area AR2 expands toward the edges of the image from an area having the medium size in the image. Thus, as illustrated in FIG. 18A, when color printer 70 forms print image IM2 on a surface of print medium 5 such as a plain paper sheet, for example, and if there is no misalignment of the print image itself relative to the surface, it is possible to make a part of ground color GC4 and upper color UC4 laid one another spread out beyond the edge of the sheet in the edge portion of the image, and thereby to prevent ground color GC4 and the color of the sheet from becoming visible. Further, as illustrated in FIG. 18B, even if ground color GC4 and upper color UC4 laid one over another are misaligned with each other in the edge portion of the image in color printer 70, it is possible to make ground color GC4 spread out from under upper color UC4 outside the edge of the sheet, and thereby to prevent ground color GC spreading out from under upper color UC4 from becoming visible. Furthermore, as illustrated in FIG. 18C, even if print image IM2 itself is misaligned relative to the surface of print medium 5 in color printer 70, it is possible to make ground color GC4 and upper color UC4 laid one over another aligned along the edge of the sheet in the edge portion of the image, and thereby to prevent ground color GC4 and the color of the sheet from becoming visible in this case as well.

Next, in the case where print image IM2 in which white as the special color serves as the ground color is formed in the borderless printing mode on the surface of a transfer paper sheet, upon loading image data of an image to be printed from the outside, second image input unit 73 generates print image data similar to the above case except that the size of the print image (the second borderless image size in this case) as well as the width of an extension area of the image are different, and sends it to boundary correction area detector 62 together with printing mode information. Then, upon receiving boundary correction area detection data as well as the print image data and the printing mode information from boundary correction area detector 62, second edge-portion correction area detector 77 executes second edge-portion correction area detection processing and judges a printing mode (i.e., the borderless printing mode in this case) based on the printing mode information. Further, second edge-portion correction area detector 77 retrieves the second pixel search range information and the fourth area detection range information from storage unit 72 in this case according to the setting made by setting unit 76 as well as the judgment result, but executes the second edge-portion correction area detection processing similar to the above to detect an edge-portion correction area for the borderless mode. Second edge-portion correction area detector 77 then sends edge-portion correction area detection data to second correction processor 78 together with the print image data and the boundary correction area detection data. Upon receiving the boundary correction area detection data and the edge-portion correction area detection data as well as the print image data from second edge-portion correction area detector 77, second correction processor 78 retrieves the second pixel search range information from storage unit 72 according to the setting made by setting unit 76, but executes the second correction processing similar to the above to generate corrected print image data and sends it to output image processor 65.

Next, in the case where print image in which the base colors serve as the ground color (that is, the color of clear as the special color serves as the upper color) is formed in the borderless printing mode on the surface of a plain paper sheet, upon loading image data of an image to be printed from the outside, second image input unit 73 generates print image data similar to the above case except that the pixel value of clear instead of the pixel value of white is stored in each pixel, and sends it to boundary correction area detector 62 together with printing mode information. Then, upon receiving boundary correction area detection data as well as the print image data and the printing mode information from boundary correction area detector 62, second edge-portion correction area detector 77 executes a second edge-portion correction area detection processing and judges a printing mode (i.e., the borderless printing mode in this case) based on the printing mode information. Further, second edge-portion correction area detector 77 retrieves the second pixel search range information and the fourth area detection range information from storage unit 72 according to the setting made by setting unit 76 as well as the judgment result, and executes the second edge-portion correction area detection processing similar to the above to detect an edge-portion correction area for the borderless mode. Second edge-portion correction area detector 77 then sends edge-portion correction area detection data to second correction processor 78 together with the print image data and the boundary correction area detection data. Upon receiving the boundary correction area detection data, the edge-portion correction area detection data and the print image data from second edge-portion correction area detector 77, second correction processor 78 retrieves the second pixel search range information from storage unit 72 according to the setting made by setting unit 76, and executes the second correction processing similar to the above to generate corrected print image data and sends it to output image processor 65.

(2-3) Second Image Processing

Next, with the flowcharts illustrated in FIGS. 19 and 20 in which portions that are correspond to those of FIGS. 12 and 13 are given reference numerals that are the same as those of FIGS. 12 and 13, a description is given of second edge-portion correction area detection processing procedure RT4 and second correction processing procedure RT5 that second controller 71 executes as part of a second image processing procedure according to the second image processing program. Note that boundary correction area detection processing procedure RT1, that second controller 71 executes as part of the second image processing procedure, is similar to that in the case of embodiment 1, and therefore is not described. When first controller 50 finishes boundary correction area detection processing procedure RT1, it subsequently starts second edge-portion correction area detection processing procedure RT4 illustrated in FIG. 19 according to the second image processing program. Upon starting second edge-portion correction area detection processing procedure RT4, in step SP31, second controller 71 judges whether or not the printing mode at this time is the borderless printing mode, and proceeds to step SP32 if a positive result is obtained. Then, in step SP32, second controller 71 designates one of the pixels in a print image as a focused pixel PS1, and judges whether or not both conditions are satisfied as to where this focused pixel PS1 is a pixel of extension area AR5, and where any pixel of colored area AR2 exists within a pixel search range (i.e., among neighboring pixels PN1 in first pixel search range SE1 or the second pixel search range which are located around focused pixel PS1). If a positive result is obtained in step SP 32, it indicates that focused pixel PS1 is located near colored area AR2 in an edge portion of the image and therefore the width of colored area AR2 can be widened toward the edges of the image (i.e., toward the outside of print medium 5) by correcting the pixel values of focused pixel PS1 so that the focused pixel may be represented with the ground color and the upper color. Thus, if a positive result is obtained in step SP32, second controller 71 proceeds to step SP33 to judge that this focused pixel PS1 is an edge-portion correction pixel of the edge-portion correction area for the borderless mode, and proceeds to next step SP34. In contrast, if a negative result is obtained in step SP32, it indicates that focused pixel PS1 is relatively away from colored area AR2 in the edge portion of the image, and therefore the width of colored area AR2 cannot be widened toward the edges of the image even by correcting the pixel values of focused pixel PS1 so that the focused pixel may be represented with the ground color and the upper color. Thus, if a negative result is obtained in step SP32, second controller 71 proceeds to step SP35 to judge that this focused pixel PS1 is a non-correction pixel outside the edge-portion correction area for the borderless mode, and proceeds to step SP34. Note that, if a negative result is obtained in step SP31 because the printing mode at this time is the bordered printing mode, second controller 71 proceeds to step SP11 and executes the processing in step SP11, then executes the processing in step SP12 or the processing in step SP14, and then proceeds to step SP34. In step SP34, second controller 71 judges whether or not the judgment on all the pixels in the print image is over, and goes back to step SP31 if a negative result is obtained. When second controller 71 finishes judging all the pixels in the print image to be either an edge-portion correction pixel or a non-correction pixel, it detects the edge-portion correction area for the borderless mode or edge-portion correction area for bordered mode AR3 based on the judgment result. Then, if a positive result is obtained in step SP34, second controller 71 proceeds to next step SP36 to terminate second edge-portion correction area detection processing procedure RT4.

When second controller 71 finishes second edge-portion correction area detection processing procedure RT4, it subsequently starts second correction processing procedure RT5 illustrated in FIG. 20 according to the second image processing program. Upon starting second correction processing procedure RT5, in step SP41, second controller 71 designates one of the pixels in the print image as a focused pixel PS1, and judges whether or not this focused pixel PS1 is an edge-portion correction pixel of the edge-portion correction area for the borderless mode. If a positive result is obtained, second controller 71 proceeds to step SP42. Then, in step SP42, second controller 71 corrects the edge-portion correction area for the borderless mode so that all of the five kinds of pixel values of the edge-portion correction pixel of the edge-portion correction area for the borderless mode may be replaced with a value larger than "0," and proceeds to next step SP43. In contrast, if a negative result is obtained in step SP41, second controller 71 proceeds to step SP44 to judge whether or not focused pixel PS1 is an edge-portion correction pixel of the edge-portion correction area for the bordered mode. If a positive result is obtained in step SP44, second controller 71 executes the processing in step SP22 and then proceeds to step SP43. Alternatively, if a negative result is obtained in step SP44, second controller 71 executes the processing in step SP24, and then executes the processing in step SP25 and proceeds to step SP43 or proceeds to step SP43 without executing the processing in step SP25. In step SP43, second controller 71 judges whether or not the correction is over on the edge-portion correction area for borderless mode and boundary correction area AR4 in the print image or the correction on edge-portion correction area for bordered mode AR3 and boundary correction area AR4 in the print image. If a negative result is obtained in step SP43 because there is a pixel not yet judged to be an edge-portion correction pixel or not nor judged to be a boundary correction pixel or not and therefore the correction is not over, second controller 71 goes back to step SP41. Then, if a positive result is obtained in step SP43 because the correction on the edge-portion correction area for the borderless mode and boundary correction area AR4 in the print image or the correction on the edge-portion correction area for bordered mode AR3 and boundary correction area AR4 in the print image is over, second controller 71 proceeds to next step SP45 to terminate second correction processing procedure RT5.

(2-4) Operation and Effect of Embodiment 2

When color printer 70 having the above configuration forms print image IM2 in the borderless printing mode, second image input unit 73 generates print image data of print image IM2 which has an image size larger than the medium size and in which colorless extension area AR5 extends beyond an area having the medium size in the image. Then, in color printer 70, second controller 71 generates corrected print image data by detecting the edge-portion correction area for the borderless mode, which extends along the edges of the image adjacent to colored area AR2, in extension area AR5 of print image IM2 which is based on the print image data, and then making such a correction that the detected area may be represented with the ground color and the upper color laid one over another.

With the configuration above, color printer 70 can widen the width of colored area AR2 in print image IM2 based on the print image data such that colored area AR2 expands toward the edges of the image from an area having the medium size in the image. Accordingly, even if print image IM2 itself is misaligned relative to the surface of print medium 5 or the upper color and the ground color laid one over another in the edge portion of print image IM2 are misaligned with each other when color printer 70 forms print image IM2 on a surface of print medium 5 in the borderless printing mode, it is possible to avoid a situation where the color of print medium 5, which should be originally hidden under print image IM2 and invisible, turns visible or where the ground color spreading out from under the upper color is visible. Because it is possible to avoid this type situation, it is thus possible to prevent the deterioration in the quality of print image IM2.

In addition, in color printer 70, second controller 71 corrects the edge-portion correction area for the borderless mode such that, for each pixel of the edge-portion correction area for borderless mode, each of the pixel values of the pixel is replaced with the largest value among the corresponding pixel values of one or more pixels of colored area AR2 in the pixel search range, including the pixel as a center pixel. Accordingly, color printer 70 can expand a portion of colored area AR2, being a boundary with the edge-portion correction area for the borderless mode, toward the edge-portion correction area for the borderless mode while hardly changing the color thereof. Thus, color printer 1 can also prevent a deterioration in the image quality which would otherwise be caused if the portion of colored area AR2 expanded by the correction on the edge-portion correction area for the borderless mode turns to a color different from its original color.

(3) Other Embodiments (3-1) Other Embodiment 1

Note that, in embodiments 1 and 2 described above, the description is given of the case where an edge-portion correction area for the borderless mode is corrected such that each of the pixel values of the ground color and the upper color that each pixel of the edge-portion correction area for borderless mode has is replaced with the largest value among the pixel values of the corresponding one of the ground color and the upper color that pixels in a pixel search range including the pixel as a center pixel respectively have. However, not limited thereto, the invention may be so configured that the edge-portion correction area for the borderless mode is corrected such that each of the pixel values of the ground color and the upper color that each pixel of the edge-portion correction area for borderless mode has is replaced with the average value of the pixel values of the corresponding one of the ground color and the upper color that pixels in a pixel search range including the pixel as a center pixel respectively have. With the above configuration as well, the invention can expand a portion of colored area AR2 on a central side of the image, being a boundary with the edge-portion correction area for the borderless mode, toward the edge-portion correction area for the borderless mode while hardly changing the color thereof. Alternatively, the invention may be so configured that the edge-portion correction area for borderless mode is corrected to be represented only with the upper color such that only the pixel value of the upper color that each pixel of the edge-portion correction area for borderless mode has is replaced with the largest value among the pixel values of the upper color that pixels in a pixel search range including the pixel as a center pixel respectively have, or replaced with the average value of the pixel values of the upper color that pixels in the pixel search range including the pixel as a center pixel respectively have. With the above configuration as well, the invention can achieve an effect similar to that in embodiment 2 described above.

(3-2) Other Embodiment 2

Further, in embodiments 1 and 2 described above, the description is given of the case where an edge-portion correction area for the bordered mode is corrected such that the pixel value of the ground color that each pixel of the edge-portion correction area for bordered mode has is replaced with "0." However, not limited thereto, the invention may be so configured that the edge-portion correction area for the bordered mode is corrected such that the pixel value of the ground color that each pixel of the edge-portion correction area for the bordered mode has is replaced with the average value of the pixel values of the ground color that pixels in a pixel search range including the pixel as a center pixel respectively have, or is replaced with a predetermined value which is selected within a range that a pixel value can take (i.e., from "0" to "255") excluding the smallest value and the largest value. With the above configuration, the invention can prevent a situation where, when the width of colored area AR2 including the edge-portion correction area for the bordered mode is relatively narrow in an edge portion of an image, for example, the width of the ground color in colored area AR2 is further narrowed and the ground color becomes unable to fully exert its foundation function, which would otherwise be caused if the pixel value of the ground color that each pixel of the edge-portion correction area for bordered mode has is replaced with "0." Besides, in the case where the pixel value of the ground color that each pixel of an edge-portion correction area for the bordered mode has, is replaced with the average value of the pixel values of the ground color that pixels in a pixel search range including the pixel as a center pixel respectively have, the invention may set the pixel search range wider than the width of the edge-portion correction area for bordered mode. By doing so, when colorless area AR1 abuts on the edge-portion correction area for the bordered mode, for example, the pixel value of the ground color that each pixel of the edge-portion correction area for the bordered mode has, can be made smaller than the largest value within a range that this value can take. As a result, although the ground color spreads out from under the upper color if the ground color and the upper color laid one over another are misaligned with each other in an edge portion of a print image when the image is formed on a surface of print medium 5, the invention can make the density of the spread-out portion relatively low to make this portion less likely to stand out, so that the deterioration in the quality of the print image can be reduced. In addition, in the case where the pixel value of the ground color that each pixel of the edge-portion correction area for the bordered mode has is replaced with a predetermined value which is selected within a range that a pixel value can take excluding the smallest value and the largest value, even if the predetermined value is set as small as possible, the invention can make the ground color, which spreads out from under the upper color when a print image is formed on a surface of print medium 5, less likely to stand out and thus can reduce the deterioration in the quality of the print image.

(3-3) Other Embodiment 3

Further, in embodiments 1 and 2 described above, the description is given of the case where a boundary correction area adjacent to colored area AR2 is detected in colorless area AR1 located in a central portion of a print image and corrected such that the pixel value of the upper color that each pixel of the boundary correction area has is replaced with the largest value among the pixel values of the upper color that pixels in a pixel search range including the pixel as a center pixel respectively have. However, not limited thereto, the invention may be so configured that a boundary correction area adjacent to colored area AR2 is detected in colorless area AR1 located in a central portion of a print image and corrected such that the pixel value of the upper color that each pixel of the boundary correction area has is replaced with the average value of the pixel values of the upper color that pixels in a pixel search range including the pixel as a center pixel respectively have. With the above configuration as well, the invention can expand a portion of colored area AR2 in a central portion of the image, being a boundary with the boundary correction area, toward the boundary correction area while hardly changing the color thereof. Alternatively, the invention may be so configured that a boundary correction area adjacent to colorless area AR1 is detected in colored area AR2 located in the central portion of the print image and corrected such that the pixel value of the ground color that each pixel of the boundary correction area has is replaced with "0." With the above configuration as well, the invention can narrow the width of the ground color in colored area AR2 relative to the width of the upper color laid over the ground color, and accordingly this makes it possible to avoid the situation where the ground color spreads out from under the upper color of colored area AR2 in the central portion of print image IM1 when the image is formed on a surface of print medium 5. Still alternatively, the invention may be so configured that, when a boundary correction area is detected in colored area AR2 located in the central portion of the print image, the boundary correction area is corrected such that the pixel value of the ground color that each pixel of the boundary correction area has is replaced with the average value of the pixel values of the upper color that pixels in a pixel search range including the pixel as a center pixel respectively have. With the above configuration, the invention can prevent a situation where, when the width of colored area AR2 is relatively narrow, for example, the width of the ground color is further narrowed and the ground color becomes unable to fully exert its foundation function, which would otherwise be caused if the pixel value of the ground color is replaced with "0."

(3-4) Other Embodiment 4

Further, in embodiments 1 and 2 described above, the description is given of the case where an edge-portion correction area for the bordered mode, or an edge-portion correction area for the borderless mode, is detected in a print image after a boundary correction area is detected. However, not limited thereto, the invention may be so configured that the boundary correction area is detected in the print image after the edge-portion correction area for the bordered mode or the edge-portion correction area for the borderless mode is detected, or may be so configured that the boundary correction area as well as the edge-portion correction area for the bordered mode or the edge-portion correction area for the borderless mode are detected in a time-sharing processing or at the same time.

(3-5) Other Embodiment 5

Further, in embodiments 1 and 2 described above, the description is given of the case where, while sequentially designating each of pixels in a print image as a focused pixel, first controller 50 or second controller 71 judges whether this focused pixel is an edge-portion correction pixel or a non-correction pixel to detect an edge-portion correction area for the borderless mode or an edge-portion correction area for the bordered mode. However, not limited thereto, the invention may be so configured as follows, for example. Specifically, first image input unit 52 or second image input unit 73 divides print image data into data segments on several-lines by several-lines basis, further divides each of the data segments into block data segments, and sends each of the block data segments to first controller 50 or second controller 71 together with information on the position of the block data segment in the print image data. Then, according to the position information loaded together with the block data segments, first controller 50 or second controller 71 detects an edge-portion correction area for the borderless mode or an edge-portion correction area for the bordered mode on a block-by-block basis while selectively using the block data segments along the edges of the image. With the above configuration, the invention can reduce the processing of the load placed when first controller 50 or second controller 71 executes the first edge-portion correction area detection processing or the second edge-portion correction area detection processing.

(3-6) Other Embodiment 6

Further, in embodiments 1 and 2 described above, the description is given of the case where first controller 50 and second controller 71 execute the first and second image processing procedures, described above with FIGS. 11 to 13 and FIGS. 19 and 20, according to the first and second image processing programs stored in storage units 51 and 72 in advance. However, not limited thereto, the invention may be so configured that first controller 50 and second controller 71 of color printers 1 and 70 execute the first and second image processing procedures with the first and second image processing programs installed via a computer-readable storage medium storing therein the first and second image processing programs, or with the first and second image processing programs installed from the outside using a wired/wireless communication medium such as a local area network, the Internet, or a digital satellite broadcast. Incidentally, a computer-readable storage medium through which to install the first and second image processing programs in color printers 1 and 70 to make them executable may be implemented by a package medium such as a flexible disc, a CD-ROM (Compact Disc-Read Only Memory), or a DVD (Digital Versatile Disc), or may be implemented by a semiconductor memory, a magnetic disc, or the like storing therein various programs temporarily or permanently. Further, a wired/wireless communication medium such as a local area network, the Internet, or a digital satellite broadcast may be used as a unit that stores the first and second image processing programs in a computer-readable storage medium. Furthermore, the first and second image processing programs may be stored in a computer-readable storage medium via various communication interfaces such as a router and a modem.

(3-7) Other Embodiment 7

Further, in embodiments 1 and 2 described above, the description is given of the case where the image processing device according to the invention is applied to color printers 1 and 70 of secondary transfer type described above with FIGS. 1 to 20. However, not limited thereto, the invention is widely applicable to other image processing devices of various configurations including a color printer of primary transfer type, an MFP (Multi-Function Peripheral), a facsimile machine, a multifunction device, a copier, and an information processing device such as a computer.

(3-8) Other Embodiment 8

Further, in embodiments 1 and 2 described above, the description is given of the case where each of first controller 50 and second controller 71 described above with FIGS. 1 to 20 is employed as an edge-portion correction area detector that detects an edge-portion correction area in an edge portion of a print image based on print image data, the edge-portion correction area extending along the edges of the image represented with the ground color and the upper color laid one over another. However, not limited thereto, the invention may widely employ other edge-portion correction area detectors having various configurations including an edge-portion correction area detection circuit having a hardware configuration for detecting an edge-portion correction area in an edge portion of a print image based on print image data, the edge-portion correction area extending along the edges of the image represented with the ground color and the upper color laid one over another.

(3-9) Other Embodiment 9

Further, in embodiments 1 and 2 described above, the description is given of the case where print image data of a print image described above with FIGS. 1 to 20 having an image size smaller than the medium size is employed as print image data of a print image in an edge portion of which an edge-portion correction area that extends along the edges of the image represented with the ground color and the upper color laid one over another is detected. However, not limited thereto, the invention may widely employ other various kinds of print image data having various configurations including print image data of a print image having the same image size as the medium size and print image data that stores for each pixel various pixel values, with which whether the pixel is to be represented with the ground color and/or the upper color or not can be set, in place of, or in addition to, pixel values representing the densities.

(3-10) Other Embodiment 10

Further, in embodiments 1 and 2 described above, the description is given of the case where each of first controller 50 and second controller 71 described with FIGS. 1 to 20 is employed as a correction processor that corrects an edge-portion correction area of a print image. However, not limited thereto, the invention may widely employ other correction processors having various configurations including a correction processing circuit having a hardware configuration for correcting an edge-portion correction area of a print image.

The invention may be used for image processing devices including an electrophotographic color printer, an MFP, a facsimile machine, a multifunction device, a copier, and an information processing device.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An image processing device comprising:
   a correction processor configured to correct print image data by correcting corresponding pixel values of each pixel of an edge-portion correction area in an edge portion of a print image based on the print image data, the edge-portion correction area extending along image edge that has a ground color and an upper color over the ground color in the edge portion,
   wherein,
   when the print image is formed with a first image formation method, the correction processor corrects pixels in the edge-portion correction area along the image edge within a first area detection range in a shape of a frame of a first width in the edge portion of the print image based on the print image data, the first area detection range having a width set according to an amount of first misregistration estimated to occur between the ground color and the upper color laid one over another when the print image is formed on a surface of a print medium with the first image formation method, and,
   when the print image is formed with a second image formation method different from the first image formation method, the correction processor corrects pixels in the edge-portion correction area along the image edge within a second area detection range in a shape of a frame of a second width different from the first width in the edge portion of the print image based on the print image data, the second area detection range having a width set according to an amount of second misregistration, different from the amount of first misregistration, estimated to occur between the ground color and the upper color laid one over another when the print image is formed on the surface of the print medium with the second image formation method.

2. The image processing device according to claim 1, wherein the correction processor is configured to correct the edge-portion correction area of the print image such that the edge-portion correction area has only the upper color without the ground color.

3. The image processing device according to claim 1, wherein
   the print image data includes, for each pixel, a ground-color pixel value representing a first density of the ground color and an upper-color pixel value representing a second density of the upper color, and
   the correction processor is configured to correct the edge-portion correction area such that the edge-portion correction area has only the upper color without the ground color, by replacing the ground-color pixel value of each pixel of the edge-portion correction area in the print image with "0".

4. The image processing device according to claim 1, wherein
   the print image data includes, for each pixel, a ground-color pixel value representing a first density of the ground color and an upper-color pixel value representing a second density of the upper color, and
   the correction processor is configured to correct the edge-portion correction area such that the ground-color pixel value of each pixel of the edge-portion correction area in the print image is replaced with an average value of the ground-color pixel values of pixels in a pixel search range comprising a contiguous block of pixels within the edge-portion correction area including the pixel as a center pixel.

5. The image processing device according to claim 1, further comprising an edge-portion correction area detector configured to detect the edge-portion correction area in the edge portion of the print image based on the print image data, the edge-portion correction area extending along the image edge that has the ground color and the upper color over the ground color in the edge portion.

6. The image processing device according to claim 5, wherein
   the edge-portion correction area detector configured to detect the edge-portion correction area along the image edge within an area detection range in the image edge portion of the print image based on the print image data, the area detection range having a width set according to an amount of misregistration estimated to occur between the ground color and the upper color laid one over another when the print image is formed on a print medium.

7. The image processing device according to claim 1, wherein the print image data is a bordered print image data of a bordered print image having an image size smaller than a medium size.

8. The image processing device according to claim 7, further comprising an edge-portion correction area detector configured to detect the edge-portion correction area in the edge portion of the print image based on the print image data, the edge-portion correction area extending along the image edge that has the ground color and the upper color over the ground color in the edge portion.

9. An image processing device comprising:
   a correction processor configured to correct print image data by correcting corresponding pixel values of each pixel of an edge-portion correction area in an edge portion of a print image based on the print image data, the edge-portion correction area extending along image edge that has a ground color and an upper color over the ground color in the edge portion,
   wherein
   the print image data is a bordered print image data of a bordered print image having an image size smaller than a medium size,
   the correction processor is configured to correct pixels in an edge-portion correction area in a colorless extension area which extends beyond an area having the medium size in a borderless print image that is based on borderless print image data and has an image size larger than the medium size, the edge-portion correction area being adjacent to a colored area that has the ground color and the upper color laid one over another in the area having the medium size, and
   the correction processor is configured to correct the edge-portion correction area of the borderless print image.

10. The image processing device according to claim 9, wherein the correction processor is configured to correct the edge-portion correction area of the borderless print image such that the edge-portion correction area has the ground color and the upper color laid one over another.

11. The image processing device according to claim 9, wherein
the borderless print image data includes, for each pixel, a ground-color pixel value representing density of the ground color and an upper-color pixel value representing density of the upper color, and
the correction processor is configured to correct the edge-portion correction area such that the ground-color pixel value and the upper-color pixel value of each pixel of the edge-portion correction area in the borderless print image are respectively replaced with the largest value among the ground-color pixel values of pixels in a pixel search range of a contiguous block of pixels within the edge-portion correction area including the pixel as a center pixel, and the largest value among the upper-color pixel values thereof.

12. The image processing device according to claim 9, wherein,
when the borderless print image is formed with a first image formation method, the correction processor corrects pixels in the edge-portion correction area in the extension area of the borderless print image being based on the borderless print image data and having a first image size, and,
when the borderless print image is formed with a second image formation method, the correction processor corrects pixels in the edge-portion correction area in the extension area of the borderless print image being based on the borderless print image data and having a second image size larger than the first image size.

13. The image processing device according to claim 9, wherein the correction processor
corrects the edge-portion correction area of the borderless print image of a first image size by using a first pixel search range of a contiguous block of pixels within a size set according to an amount of first misregistration, and
corrects the edge-portion correction area of the borderless print image of a second image size by using a second pixel search range of a contiguous block of pixels within a size set according to an amount of second misregistration and larger than the first pixel search range.

14. The image processing device according to claim 9, wherein
the borderless print image data includes, for each pixel, a ground-color pixel value representing density of the ground color and an upper-color pixel value representing density of the upper color, and
the correction processor is configured to correct pixels in the edge-portion correction area such that the ground-color pixel value and the upper-color pixel value of each pixel of the edge-portion correction area in the borderless print image are respectively replaced with the average values of the ground-color pixel values and upper-color pixel values of pixels in a pixel search range of a contiguous block of pixels within the edge-portion correction area including the pixel as a center pixel, and the largest value among the upper-color pixel values thereof.

* * * * *